United States Patent [19]

Tsuruta et al.

[11] Patent Number: 5,119,357
[45] Date of Patent: Jun. 2, 1992

[54] DISC PLAYER

[75] Inventors: Yukiyasu Tsuruta, Kadoma; Takeshi Kamemura, Yao, both of Japan

[73] Assignee: Sanyo Electric Co., Ltd., Moriguchi, Japan

[21] Appl. No.: 320,130

[22] Filed: Mar. 7, 1989

[30] Foreign Application Priority Data

Mar. 8, 1988 [JP] Japan ................................ 63-54171

[51] Int. Cl.$^5$ .............................................. G11B 17/04
[52] U.S. Cl. ................................ 369/75.2; 360/99.03;
360/99.05; 369/77.1; 369/188; 369/270
[58] Field of Search ............... 369/75.1, 75.2, 77.1,
369/77.2, 185, 187, 188, 215–217, 270–271;
360/99.01, 99.02, 99.03–99.07, 99.12

[56] References Cited

U.S. PATENT DOCUMENTS

| | | | |
|---|---|---|---|
| 3,941,392 | 3/1976 | Grosemans et al. | 369/217 |
| 4,082,290 | 4/1978 | Cukrowski | 369/217 |
| 4,111,431 | 9/1978 | Dalkov | 369/217 |
| 4,395,744 | 7/1983 | Saito et al. | 369/77.2 X |
| 4,602,361 | 7/1986 | Kumaki et al. | |
| 4,627,037 | 12/1986 | Tamara et al. | 369/75.2 X |
| 4,697,259 | 7/1987 | Takanashi | 369/75.2 |
| 4,759,008 | 7/1988 | Hirano et al. | 369/187 X |
| 4,766,586 | 8/1988 | Einhaus | 369/188 X |
| 4,839,881 | 6/1989 | Takahara et al. | 369/75.2 |
| 4,903,140 | 2/1990 | Okamoto et al. | 369/199 X |

FOREIGN PATENT DOCUMENTS

| | | |
|---|---|---|
| 59-149261 | 3/1982 | Japan. |
| 60-80159 | 10/1983 | Japan. |
| 61-61659 | 9/1984 | Japan. |
| 62-271245 | 5/1986 | Japan. |

Primary Examiner—William M. Shoop, Jr.
Assistant Examiner—David Martin
Attorney, Agent, or Firm—Armstrong, Nikaido, Marmelstein, Kubovcik & Murray

[57] ABSTRACT

In a disc player according to the present invention, a single motor mounted on a chassis is coupled to a disc transport mechanism through a first power transmission system and to a pickup transport mechanism through a second power transmission system. The disc player includes a pickup restraining mechanism for restraining the pickup from moving upon the pickup reaching one end of path of its travel where the pickup is to be restrained. Approximately when the pickup reaches the path end, the restraining mechanism is coupled to the first power transmission system and thereby moved from a first position to a second position, where the restraining mechanism is coupled to the pickup transport mechanism to restrain the pickup at the path end.

8 Claims, 26 Drawing Sheets

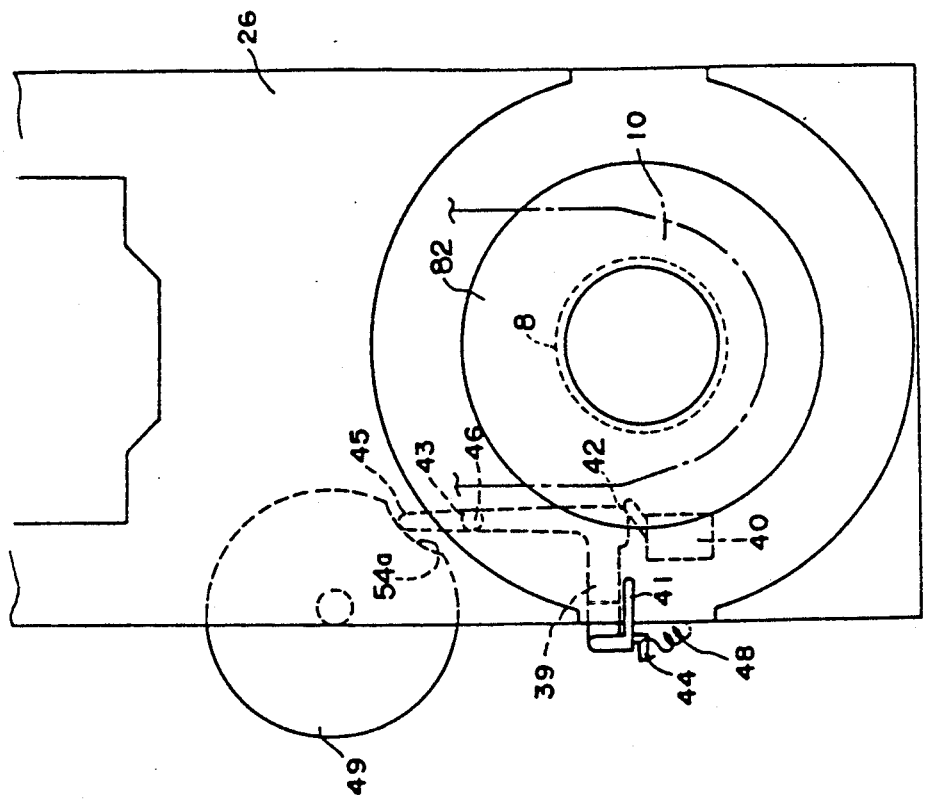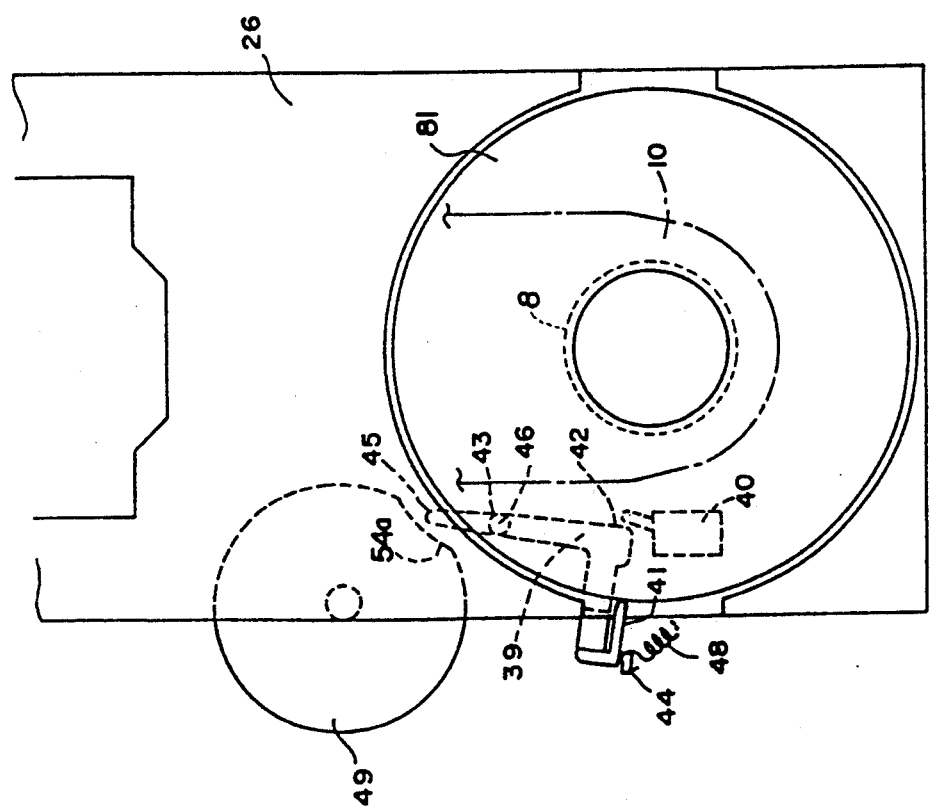

DISC PLAYER

FIELD OF THE INVENTION

The present invention relates to disc players for reproducing the signals recorded on discs, and more particularly to disc players which include a single motor provided separately from a motor for driving the disc and serving as a power source for transporting the disc and transporting the pickup.

BACKGROUND OF THE INVENTION

Disc players for optically reading audio or video signals from discs comprise a disc drive assembly having a turntable for rotating the disc, a clamp mechanism for holding the disc in pressing contact with the turntable, and a mechanism for transporting a signal reproduction pickup radially of the disc. To automatically set the disc in the signal reproduction position and to automatically unload the disc, the disc player further includes a disc carrying tray disposed at an opening in the front panel of the player and movable into and out of the player body, and a disc transport mechanism for reciprocatingly moving the tray between a disc unloaded position and a disc loaded position.

However, these mechanisms, when to be driven by separate motors, require several motors and drive control circuits for the respective motors. This gives rise to the problem of making the player large-sized and entailing an increased production cost.

Accordingly, Unexamined Japanese Patent Publication SHO 62-271245 discloses a disc player adapted to transport both the pickup and the disc by a single motor. With reference to FIG. 31 showing this disc player, a pickup 1 and a tray 26, each reciprocatingly movable, have attached thereto racks 94 and 95, respectively, and the rotation of the motor (not shown) is transmitted via a drive gear 90 to a drive member 91, which is formed with a gear portion 92 in mesh with the rack 94 of the pickup 1. By a change-over mechanism having a cam slit 98, pin 97, etc., the drive member 91 is coupled to a sector gear 96, which in turn is in mesh with the rack 95 on the tray 26.

During the reproduction of signals, the drive member 91 rotates counterclockwise to thereby transport the pickup 1 from the solid-line position to the brokenline position in FIG. 31. In this process, the changeover mechanism absorbs the rotation of the drive member 91, holding the sector gear 96 at rest.

When unloading the disc, the drive member 91 rotates clockwise from the solid-line position in FIG. 31, causing the change-over mechanism to rotate the sector gear 96 clockwise and thereby transporting the tray 26 to the broken-line position. In this process, the drive member 91 is held out of meshing engagement with the rack 94 on the pickup 1, with a toothless portion 93 of the drive member 91 opposed to the rack 94, so as not to transport the pickup 1.

With the disc player of FIG. 31, the pickup rack 94 is thus out of mesh with the drive member 91 during the transport of the tray 26 and is movable relative to the member 91, so that the pickup 1 is likely to move toward the outer periphery of the disc 81 away from the turntable 8, for example, when subjected to an impact from outside. If the pickup 1 is displaced during the transport of the tray 26, the rack 94 as displaced starts meshing with the drive member 91 when the pickup is to be thereafter transported. Consequently, when transported, the pickup is unable to reproduce signals normally.

On the other hand, Unexamined Japanese Utility Model Publication SHO 61-61659 discloses a disc player including a mechanism for locking the tray in the disc loaded position on completion of loading. The locking mechanism requires a lock pawl and lever means for operating the lock pawl and therefore has the problem of being complex in construction.

Unexamined Japanese Utility Model Publication SHO 59-149261 discloses a disc player adapted to reproduce signals from two types of discs which are different in diameter. The tray of the player is provided with a photosensor for discriminating one type from the other type. This disc player requires a lead wire for connecting the photosensor on the tray to a control circuit within the player body and accordingly has the drawback that the lead wire moves with the tray.

Unexamined Japanese Patent Publication SHO 60-80159 discloses a disc player having a lifter which is projected from the upper surface of the tray through a hole therein during the transport of the tray to slightly raise the disc on the tray by the force of a spring. When the disc is clamped, the lifter is lowered against the spring force for the disc to be placed on the turntable. However, when the disc is placed on the tray in the withdrawn position by being pushed down by the hand, the lifter is lowered against the spring force to position the disc at an indefinite level. This makes the user to feel uneasy.

SUMMARY OF THE INVENTION

An object of the present invention is to provide a disc player which comprises a single motor for transporting both the disc and the pickup and wherein the pickup can be restrained at one end of the path of its movement toward the center of the disc or toward the outer periphery of the disc during the transport of the disc.

Another object of the invention is to provide a disc player wherein a positioning mechanism of very simple construction is coupled to a tray transport mechanism for locking the tray in the disc loaded position on completion of loading of the disc.

Another object of the invention is to provide a disc player adapted to reproduce signals from two types of discs having different diameters and to identify the type of a particular disc without the need to provide a sensor on the tray as conventionally practiced.

Still another object of the invention is to provide a disc player which comprises a lifter for slightly raising a disc on the tray by the force of a spring during the transport of the disc and in which when the disc is placed on the tray in a withdrawn position by being depressed with the hand, the lifter does not retract into the tray but holds the disc at a predetermined level above the upper surface of the tray.

The disc player of the present invention comprises a motor mounted on a chassis and coupled to a disc transport mechanism through a first power transmission system and to a pickup transport mechanism through a second power transmission system, the first power transmission system having incorporated therein a first intermittent power transmission effecting power transmission during transport of a disc but not effecting power transmission during transport of a pickup, the second power transmission system having incorporated therein a second intermittent power transmission not effecting power transmission during transport of the disc but effecting power transmission during transport of the pickup.

Mounted on the chassis is a pickup restraining mechanism for restraining the pickup from travel upon the pickup reaching one end of path of its travel where the pickup is to be restrained. The pickup restraining mechanism comprises an input portion connectable to the first power transmission system approximately when the pickup reaches one end of the path, and an output portion movable from a first position to a second position with the transmission of power to the input portion, the output portion being releasable from the pickup transport mechanism at the first position and being operatively connectable to the pickup transport mechanism at the second position to restrain the pickup at the path end.

The disc player further comprises a tray positioning mechanism for locking the tray in a loading position. The positioning mechanism comprises a resilient piece provided on a feed gear constituting the tray transport mechanism, and an operating member operatively connected to the first power transmission system. The operating member comes into contact with the resilient piece to elastically deform the resilient piece upon the tray moving to the loading position. Consequently, the feed gear is biased into rotation by the repellent force of the resilient piece to thereby hold the tray in the loading position with application of pressure.

When the disc player is adapted to reproduce signals from two types of discs which are different in diameter, the player includes a disc size detecting mechanism comprising a sensor lever mounted on the chassis and movable toward or away from the turntable, a switch closable or openable by the movement of the sensor lever, a spring for biasing the sensor lever toward the turntable, and control means operatively connected to the first power transmission system for regulating the movement of the sensor lever. While the disc is being transported and clamped, the control means holds the sensor lever at a position away from the turntable. The sensor lever is released from this position after the disc has been completely clamped. Accordingly, the switch is turned on by the sensor lever when a disc of smaller diameter is clamped to the turntable but remains off when a disc of large diameter is clamped, whereby the type of disc can be identified.

Further when the disc player has a lifter for slightly raising the disc on the tray by the force of a spring while it is being transported, a stopper is provided on the chassis under the tray as located in its withdrawn position for preventing the lifter from retracting into the tray. Accordingly, the lifter will not retract completely into the tray even when the disc is depressed toward the tray when it is placed on the tray.

BRIEF DESCRIPTION OF THE DRAWINGS

FIGS. 18 and 19 are plan views illustrating the operation of a disc size detecting mechanism;

DETAILED DESCRIPTION OF EMBODIMENT

Overall Construction

Figure 1:
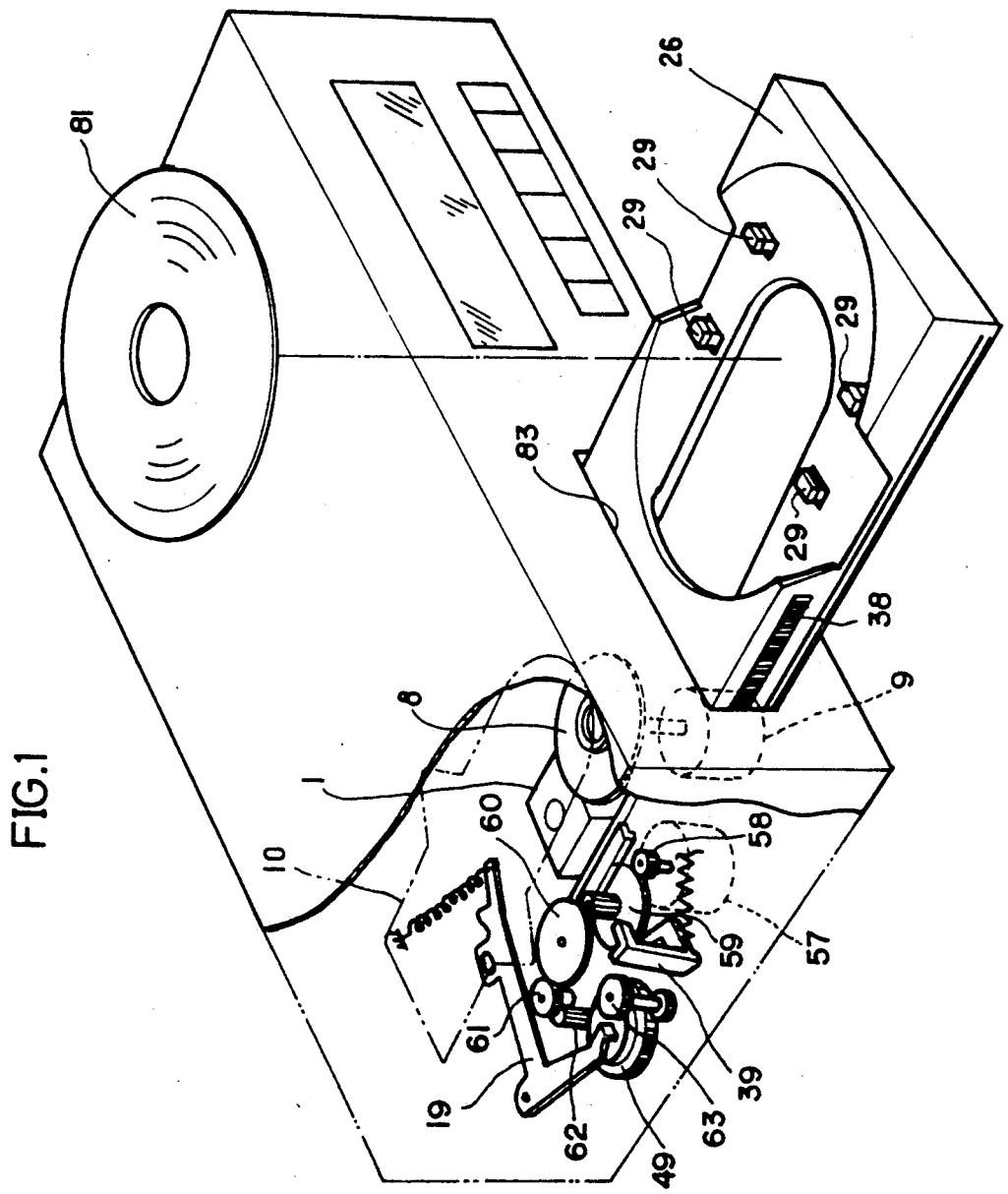
FIG. 1 is a perspective view partly broken away and showing the overall construction of a disc player embodying the invention.

With reference to FIG. 1, an opening 83 formed in the front panel of a disc player is provided with a tray 26 movable into and out of the body of the player for placing a disc 81 thereon. Provided inside the player body inwardly of the opening 83 are a disc drive assembly including a turntable 8 and a spindle motor 9, an optical pickup 1, a pickup transport mechanism, a clamp mechanism including a clamp 10, a disc transport mechanism, etc.

When a disc loading instruction is given with the disc 81 placed on the tray 26, the disc transport mechanism is initiated into operation to place the disc and the tray into the player. Subsequently, the clamp mechanism operates to lower the disc 81 on the tray 26 and clamp the disc to the turntable 8.

When the disc 81 is brought into rotation at a predetermined speed by the spindle motor 9, the pickup 1 is transported radially of the disc by the pickup transport mechanism to reproduce signals from the disc 81.

The construction and operation of the components of the player will be described in detail below.

Disc Drive Assembly

Figure 3:
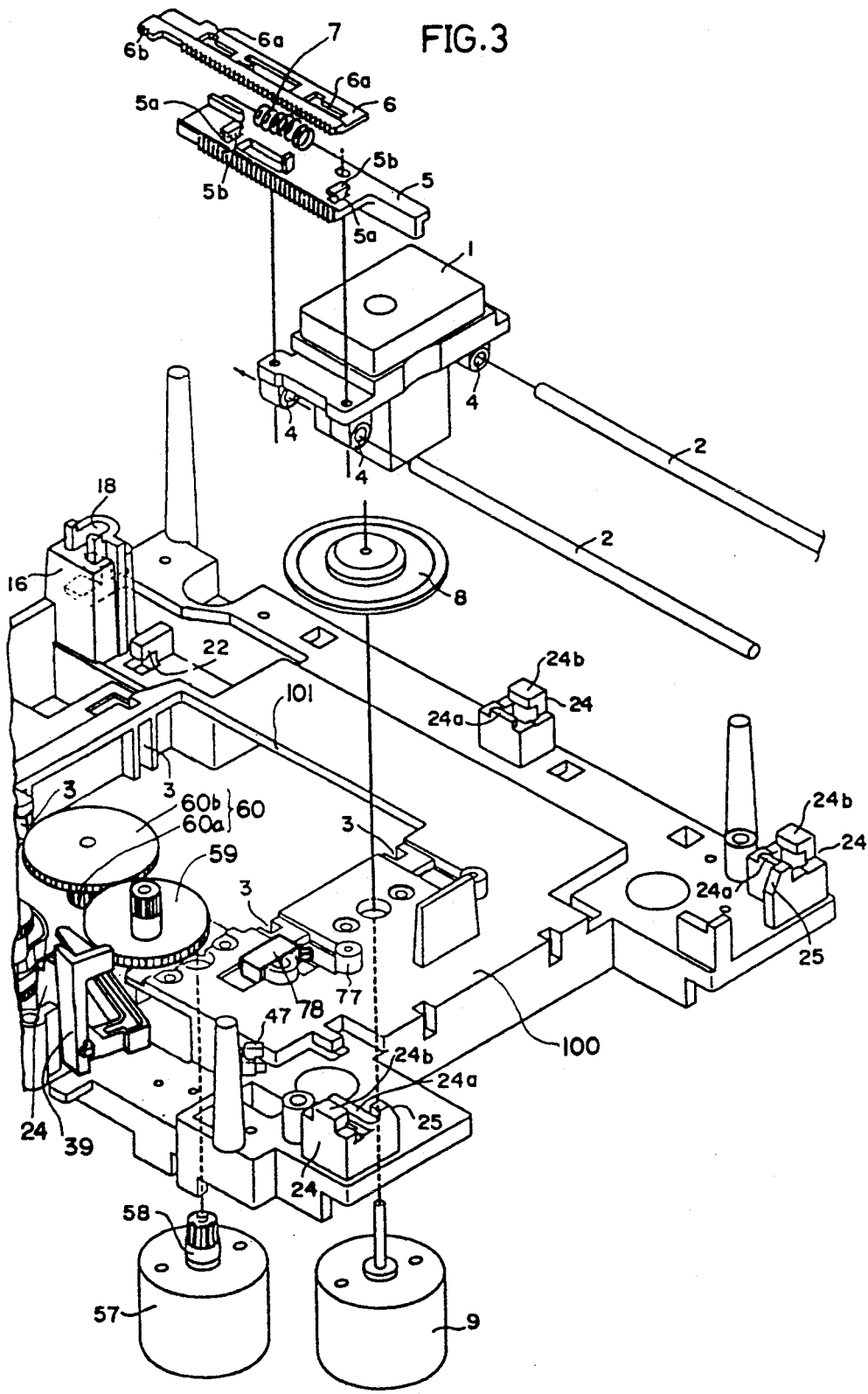
FIG. 3 is an exploded perspective view showing a pickup transport mechanism and a disc drive assembly.

With reference to FIG. 3, the spindle motor 9 provided under a chassis 100 has an output shaft projecting upward through the chassis 100. The turntable 8 is fixedly mounted on the upper end of the output shaft.

Pickup Transport Mechanism

Figure 10:
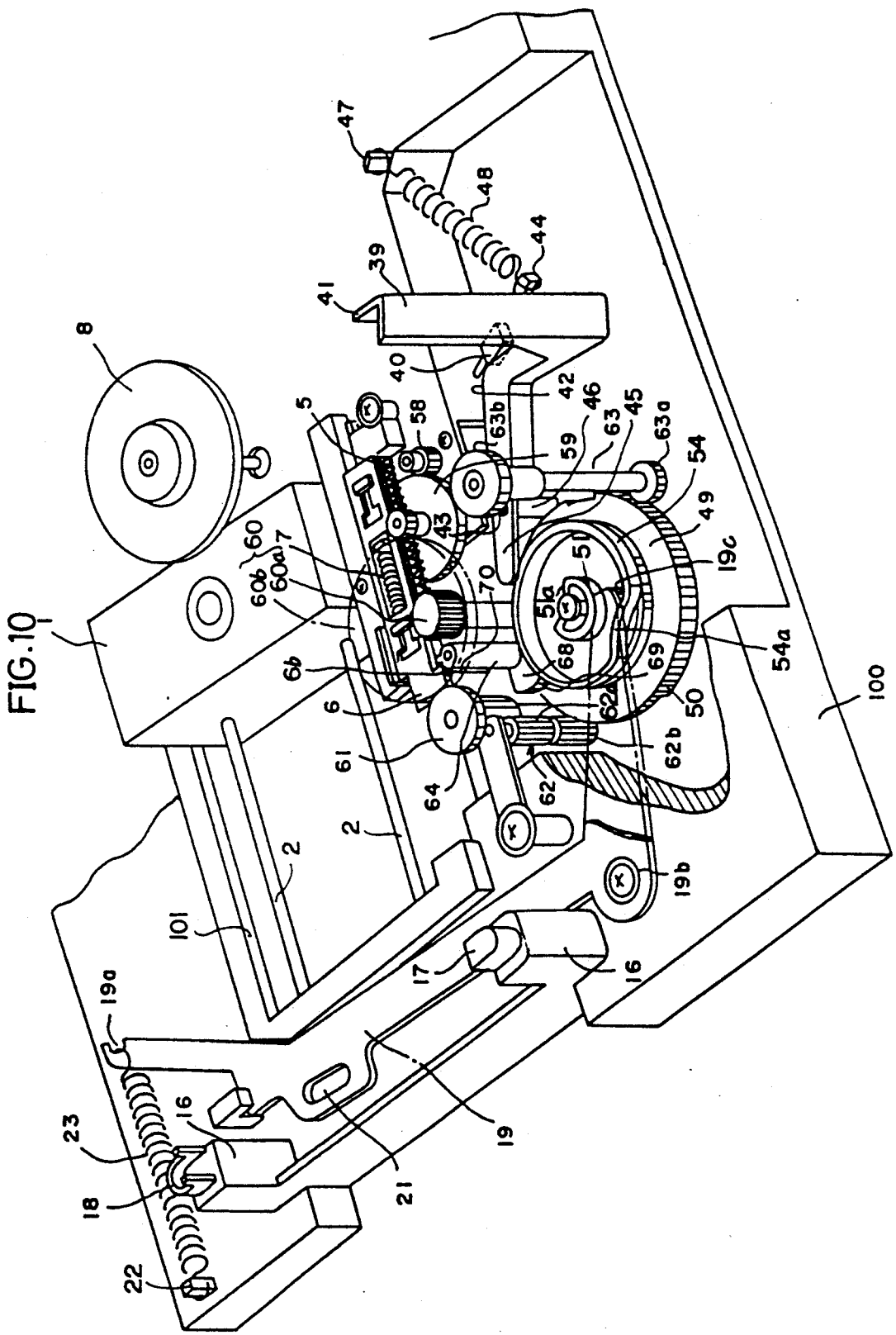
FIG. 10 is a perspective view showing a system for transmitting power from a drive gear to the disc transport mechanism, the pickup transport mechanism and a clamp mechanism, the view being partly broken away.

With reference to FIG. 10, an opening 101 formed in the chassis 100 centrally thereof is provided with a pair of guide shafts 2, 2 extending in parallel to a diametrical line of the turntable 8. The pickup 1 is slidably mounted on and guided by the shafts 2, 2 to move reciprocatingly radially of the disc.

As shown in FIG. 3, two pairs of mount portions 3, 3 and 3, 3 are opposed to each other at the opening 101 of the chassis 100. The shafts 2, 2 have their opposite ends secured to the mount portions and each slidably extend through bores 4, 4 at each of opposite sides of the pickup 1.

The pickup 1 has attached thereto first and second racks 5, 6 constituting the pickup transport mechanism. The first rack 5 is fixed to the pickup 1 with screws. The second rack 6 is disposed on the first rack 5 in engagement therewith and is slidable longitudinally thereof over a specified distance. More specifically, the first rack 5 is provided thereon with a pair of projections 5a, 5a each having an engaging portion 5b with an enlarged end, and the second rack 6 is formed with a pair of slots 6a, 6a each having the projection 5a engaged therein, with the engaging portion 5b preventing the rack 6 from slipping off. As shown in FIGS. 3 and 10, a spring 7 is provided between the two racks 5, 6 for biasing the second rack 6 leftward relative to the first rack 5.

A motor 57 attached to the chassis 100 has mounted on its output shaft a drive gear 58, which is operatively connected to a second gear 60 via a first gear 59 on the chassis 100. The second gear 60 has a small gear portion 60a under a large gear portion 60b meshing with the first gear 59. The small gear portion 60a is in mesh with both the first and second racks 5, 6 as seen in FIG. 10 to transport the pickup 1.

Since the second rack 6 is biased leftward by the spring 7, the teeth of the second rack 6 are slightly out of phase with the teeth of the first rack 5, with the result that the tooth of the gear portion 60a meshing with teeth of the two racks is held between the faces of these teeth. This precludes the small gear portion 60a from backlashing relative to the two racks 5, 6, consequently eliminating the play to be produced when the direction of travel of the pickup 1 is changed.

With reference to FIG. 3, a stopper 77 is mounted on the chassis 100 for one end of the first rack 5 to come into contact with to limit the travel of the pickup 1 toward the turntable 8. Disposed in the vicinity of the stopper 77 is a switch 78 for detecting the arrival of the pickup 1 at the position to start reproduction of the recorded signals after slightly traveling toward the outer periphery of the disc from the innermost disc portion as will be described later.

As seen in FIG. 3, the second rack 6 has at its inner end a toothless portion, and a trigger rack 6b constituting the pickup restraining mechanism to be described later.

Clamp Mechanism

Figure 2:
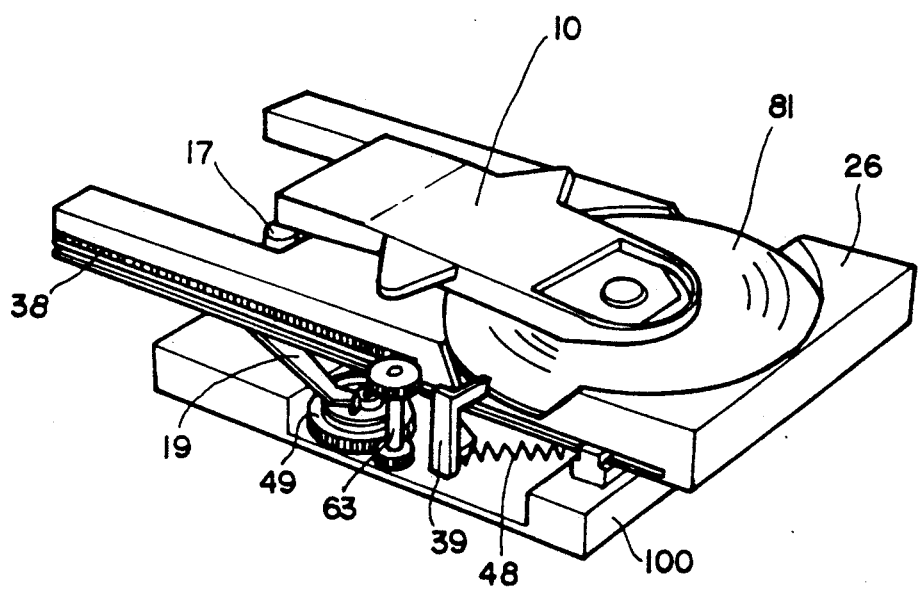
FIG. 2 is a perspective view showing a tray in a disc loaded position and a clamp holding the disc in place.

With reference to FIG. 2, the disc 81 supported on the tray 26 is pressed at its central portion into contact with the turntable 8 by the clamp 10 which is provided on the chassis 100.

Figure 5:
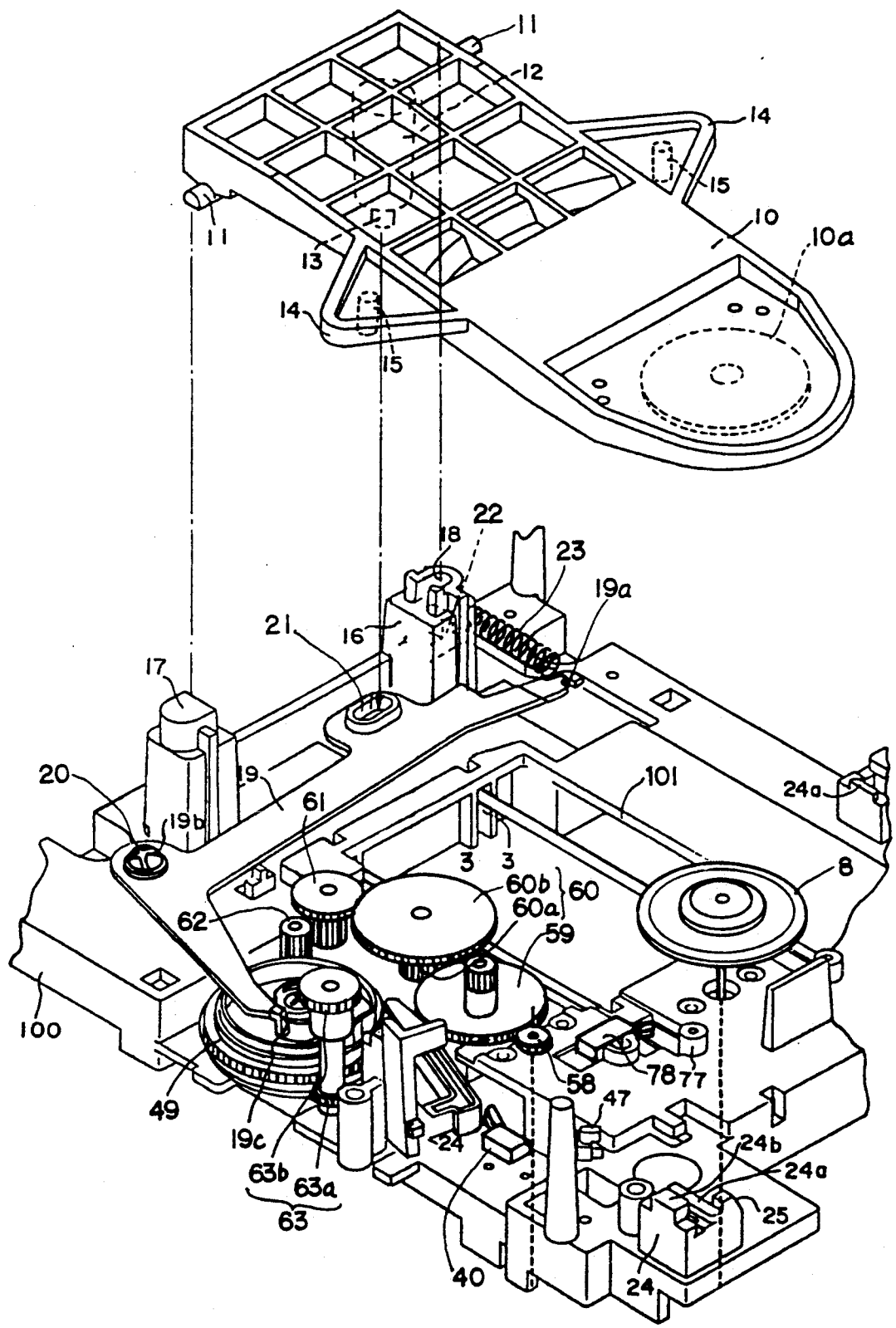
FIG. 5 is a perspective view showing the gear train with the clamper in a removed position.

As seen in FIG. 5, the clamp 10 has a pair of pivots 11, 11 projecting from the respective sides of its base end and rotatably supported by a pair of bearings 17, 18 on the chassis 1. The clamp 10 has a pressure plate 10a rotatably attached to the underside of its free end and opposed to the turntable 8 for pressing contact with the disc upper surface.

A boss 12 downwardly projecting from the base end of the clamp 10 has at its lower end a projection 13 serving as a driven portion as will be described below.

The clamp 10 further has jaws 14, 14 projecting from the respective opposite sides thereof and each provided with a pin 15 on the underside thereof. When the clamp 10 is pivotally moved, the pins 15 retract the lifters 29 to be described below into the tray, permitting lowering of the disc on the tray supported by the lifters.

Figure 4:
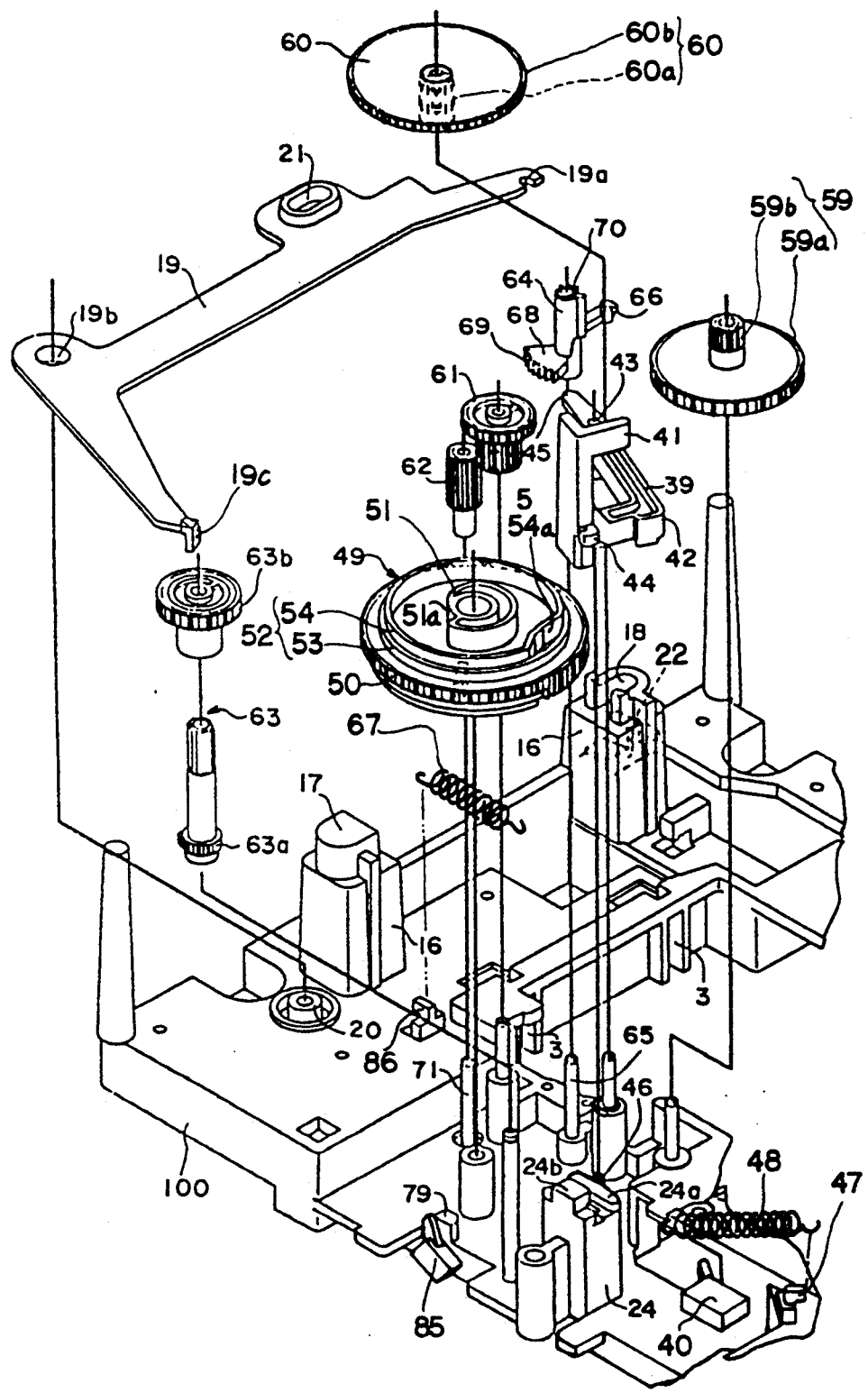
FIG. 4 is an exploded perspective view showing a train of gears constituting a first power transmission system, and a trigger member serving as a pickup restraining member.

As shown in FIGS. 4, 5 and 10, a generally L-shaped drive lever 19 is provided on the chassis 100 for driving the clamp 10. A pivot 20 on the chassis 100 is fitted in a hole 19b formed at an intermediate portion of the drive lever 19 to support the lever 19 rotatably in a plane parallel to the chassis 100. The lever 19 is formed with a slot 21 for the projection 13 of the clamp 10 to loosely fit in and is biased counterclockwise by a spring 23 extending between a projection 22 on an end portion of the chassis 100 and an engaging portion 19a at one end of the lever closer to the slot 21. The drive lever 19 has a cam follower 19c projecting downward from the other end thereof and engageable with the cam gear 49 to be described below.

Figure 29:
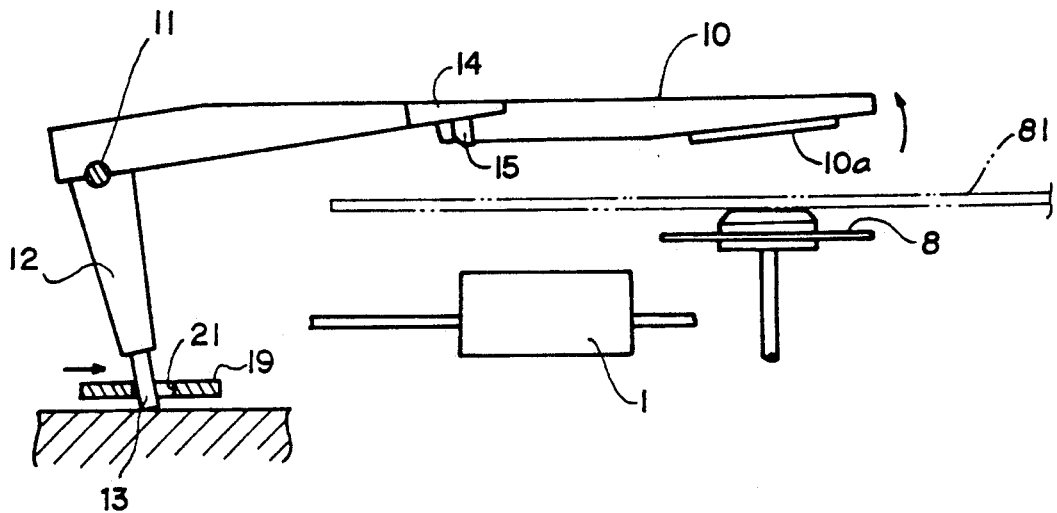
FIGS. 29 and 30 are side elevations partly broken away and showing the operation of the clamp mechanism.
Figure 30:
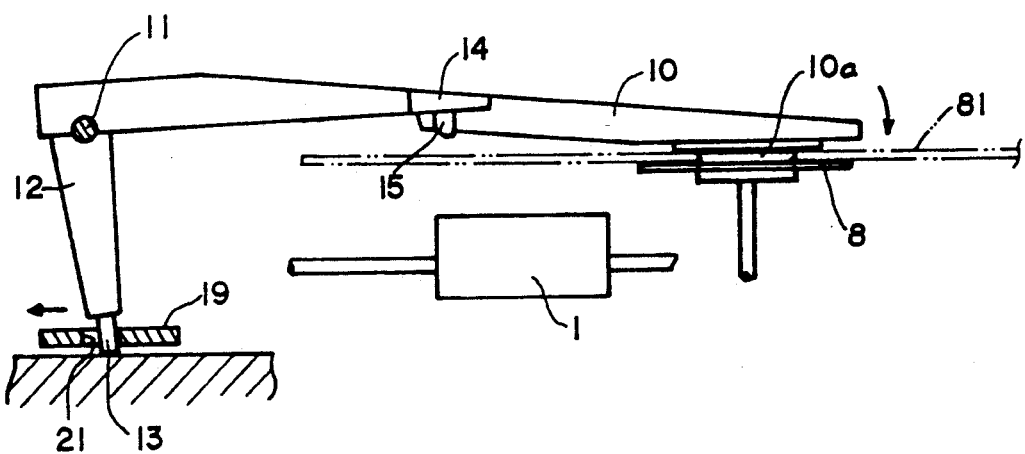
Figure 31:
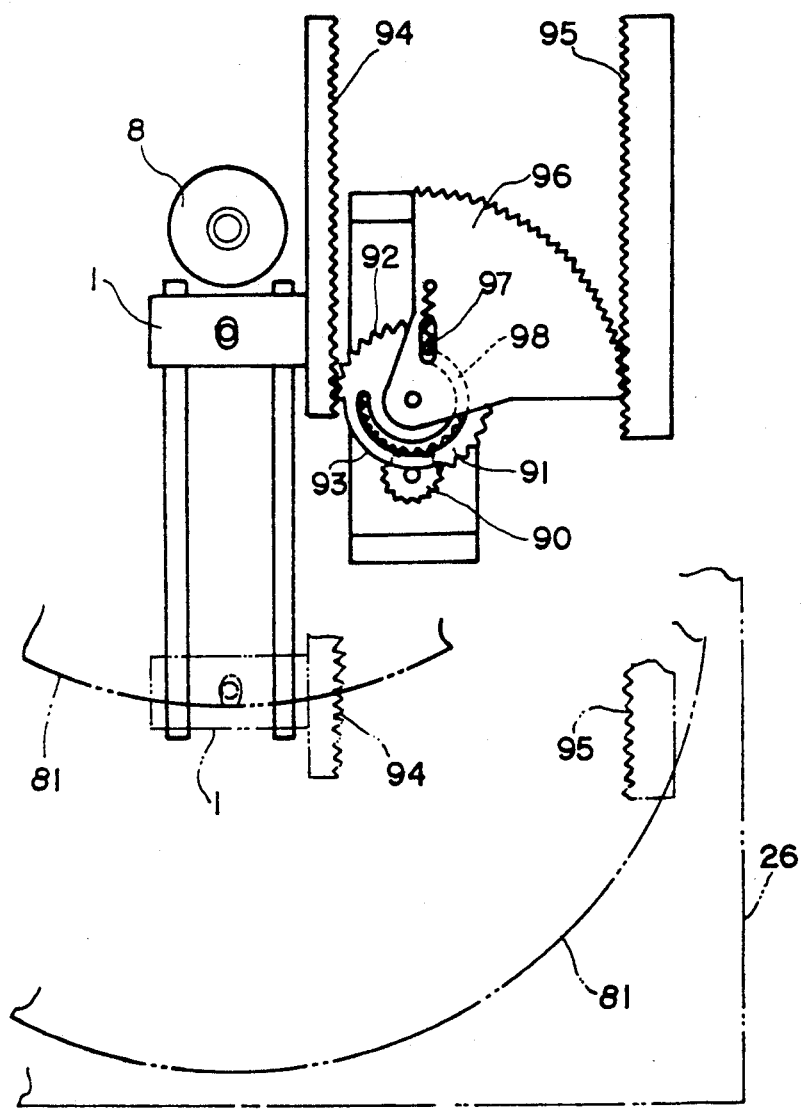
FIG. 31 is a plan view showing a pickup transport assembly and a disc transport mechanism included in a conventional disc player.

The drive lever 19 reciprocatingly moves with the rotation of the cam gear 49 as will be described later. When the drive lever 19 moves toward the turntable 8 as seen in FIG. 29, the clamp 10 is moved counterclockwise about the pivots 11 to thereby move the pressure plate 10a upward away from the turntable 8. In this state, the disc 81 is brought to a position above the turntable 8 by the disc transport mechanism to be described later. The drive lever 19 is thereafter moved away from the turntable 8, whereby the clamp 10 is moved clockwise, causing the pressure plate 10a to press the disc 81 downward into contact with the turntable 8 as shown in FIG. 30. The cam gear 49 will be described later.

Disc Transport Mechanism

Figure 6:
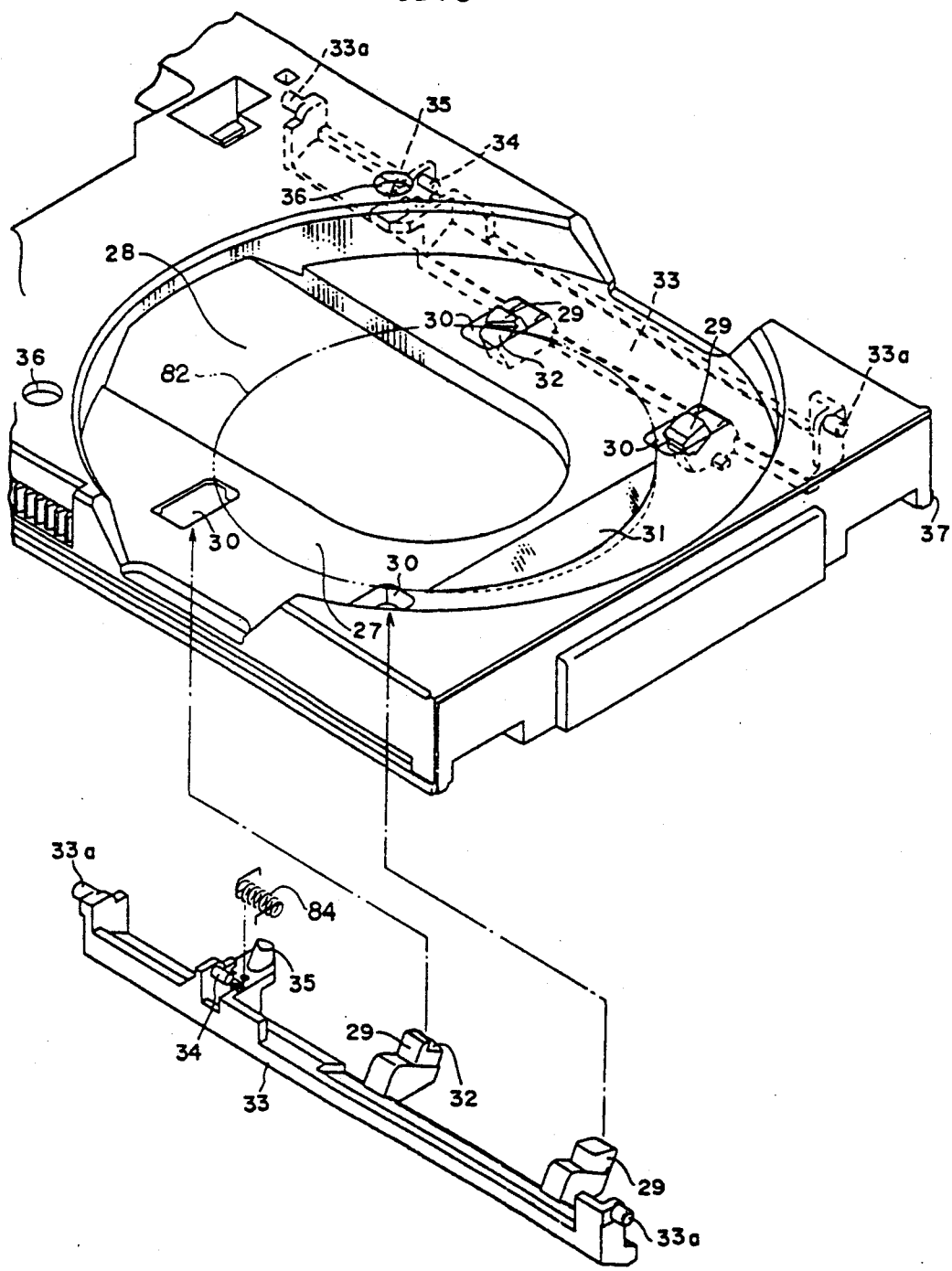
FIG. 6 is an exploded perspective view showing the tray and lifters.
Figure 8:
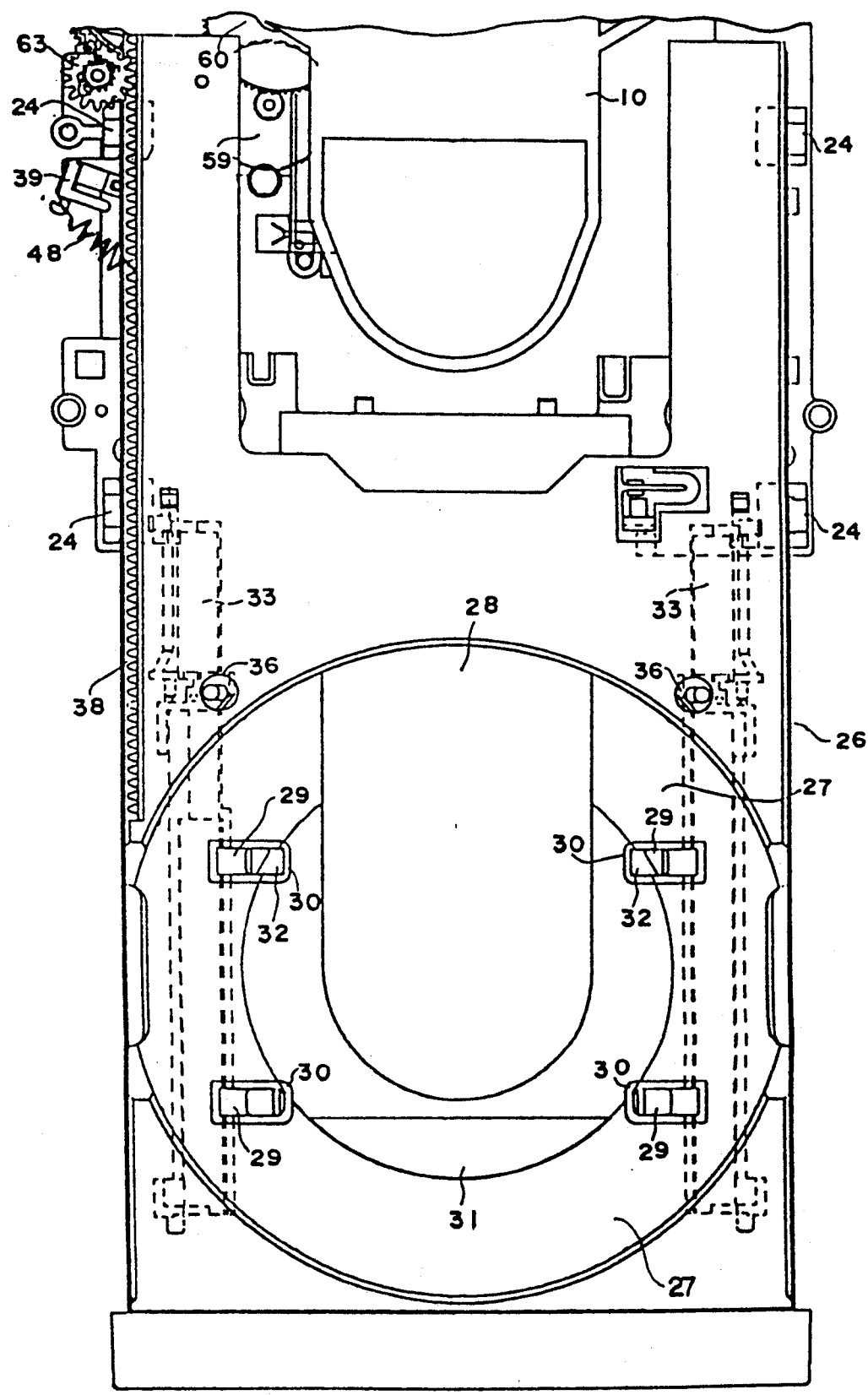
FIG. 8 is a plan view of the tray.

With reference to FIGS. 6 and 8, the tray 26 is centrally formed with a circular recessed portion 27 for accommodating the large disc. The recessed portion 27 is provided with a disc support 31 eccentrically thereof which is engageable with a peripheral portion of the small disc 82 to be placed on. The support is inclined downward toward the outer periphery of the portion 27. The tray recessed portion 27 has an opening 28 centrally thereof for accommodating the turntable 8 and the pickup 1. Around the opening 28, the recessed portion 27 is formed with four holes 30, 30, 30, 30 for the lifters to advance therethrough, and two holes 36, 36 for the clamp pins 15 to enter from above.

The tray 26 is provided under the opposite sides thereof with a pair of pivotal bars 33, 33 having two lifters 29, 29 and one pin 35 all projecting upward. Each pivotal bar 33 has pivots 33a, 33a projecting from the respective ends thereof and supported by bearings (not shown) on the tray 26, whereby the bar is made rotatable around the pivots. A torsion spring 84 fitted around a projection 34 on the bar 33 has its opposite ends attached to the tray 26 and the bar 33, whereby the pivotal bar 33 is so biased as to raise the lifters 29. When the bar 33 is pivotally moved by being thus biased, the lifters 29, 29 on the bar 33 project through the corresponding holes 30, 30 to a specified level above the tray 26, with the end of the pin 35 projecting through the hole 36 above the upper face of the tray.

Figure 9:
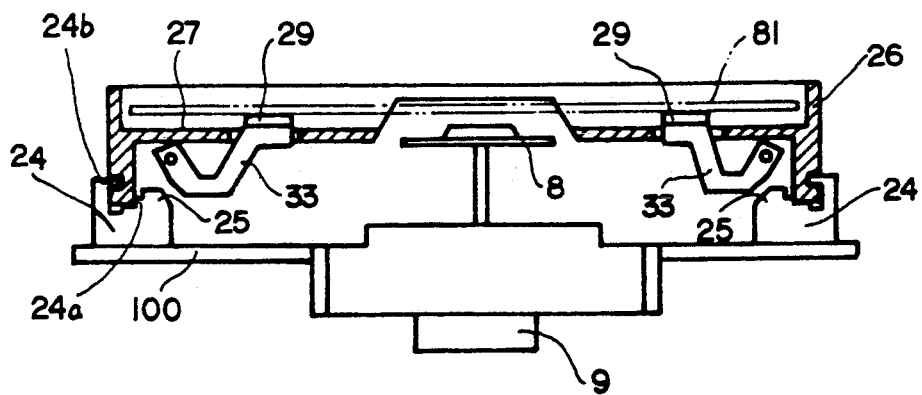
FIG. 9 is a front view partly broken away and showing the tray in engagement with support members on a chassis.

Accordingly, the disc 81 is horizontally supported at a level slightly above the turntable 8 by the four lifters 29 projecting beyond the upper surface of the tray 26 as shown in FIG. 9.

When the small disc 82 is placed on the tray 26 in engagement with the disc support 31, the disc is supported in position as slightly inclined. For this purpose, the two lifters 29, 29 disposed closer to the opening 28 are each formed with a cutout portion 32 at the upper end for engagement with the peripheral edge of the small disc as seen in FIG. 6. Consequently, the small disc 82 can be supported as slightly inclined by the two lifters 29, 29 and the support 31.

With reference to FIGS. 3 and 4, four support members 24 are provided on the chassis 100 for guiding the reciprocating travel of the tray 26. Each of the support members 24 has a projection 24a for restraining the tray in a direction perpendicular to the direction of movement of the tray and a hook 24b for restraining the tray with respect to the vertical direction. The two support members 24 arranged toward the tray withdrawn side have stoppers 25, 25 opposed to each other for limiting the retraction of the lifters 29 of the pivotal bars 33. As seen in FIG. 9, a small clearance is formed between the stopper 25 and the bar 33.

When the disc is depressed upon placement on the tray 26, the pivotal bars 33 come into contact with the stoppers 25 and are prevented from further movement, so that the lifters 29 remain at the specified level above the tray without completely retracting into the tray. Accordingly, the small disc, especially, can be positioned easily when placed on the tray.

Figure 7:
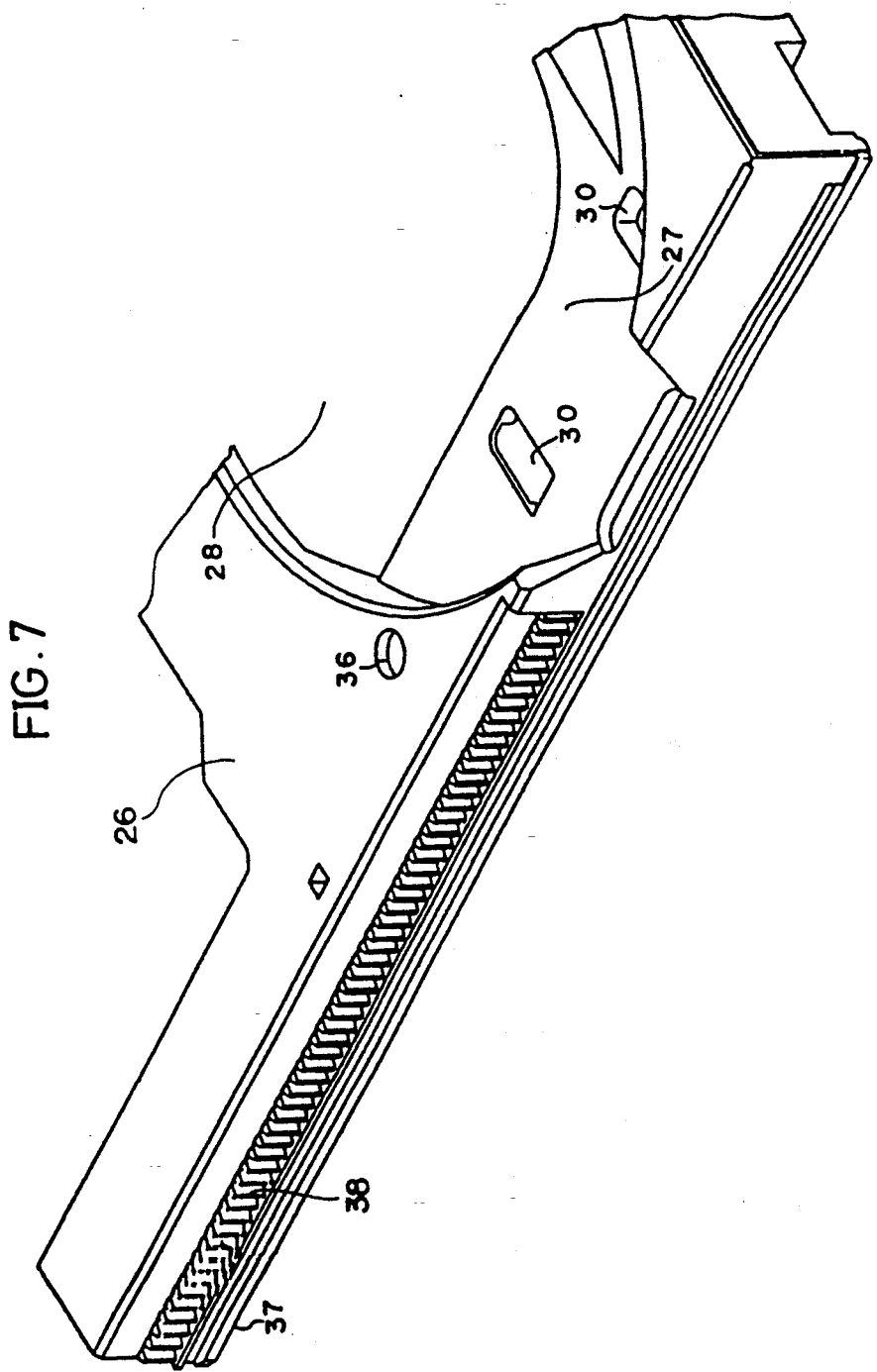
FIG. 7 is a perspective view showing a rack and a ridge formed on the tray.

As shown in FIG. 7, the tray 26 is provided on one side thereof with a rack 38 serving as a driven portion and a ridge 37 slidably engageable with the support member 24 on the chassis 100. As shown in FIG. 8, a fifth gear 63 meshing with the rack 38 at all times reciprocatingly drives the tray 26 when rotated.

Immediately before the tray 26 reaches the end of its movement toward the disc loaded side shown in FIG. 2, each pivotal bar 33 moves away from the position where it is opposed to the stopper 25. When the tray 26 reaches the path end, the bar 33 is movable until the lifters 29 thereon completely retract into the tray 26.

Accordingly, when the clamp 10 lowers to clamp the disc 81 as seen in FIG. 30, the pins 15 on the clamp 10 come into contact with the respective pins 35 on the pivotal bars 33 shown in FIG. 6 and further depress the pins 35, whereby the bars 33 are pivotally moved against the torsion springs 34. Consequently, the four lifters 29 retract into the tray 26, whereby the disc supported by the lifters is lowered onto the turntable 8 and further pressed against the turntable 8 by the pressure plate 10a of the clamp 10.

First and Second Power Transmission Systems

Figure 11:
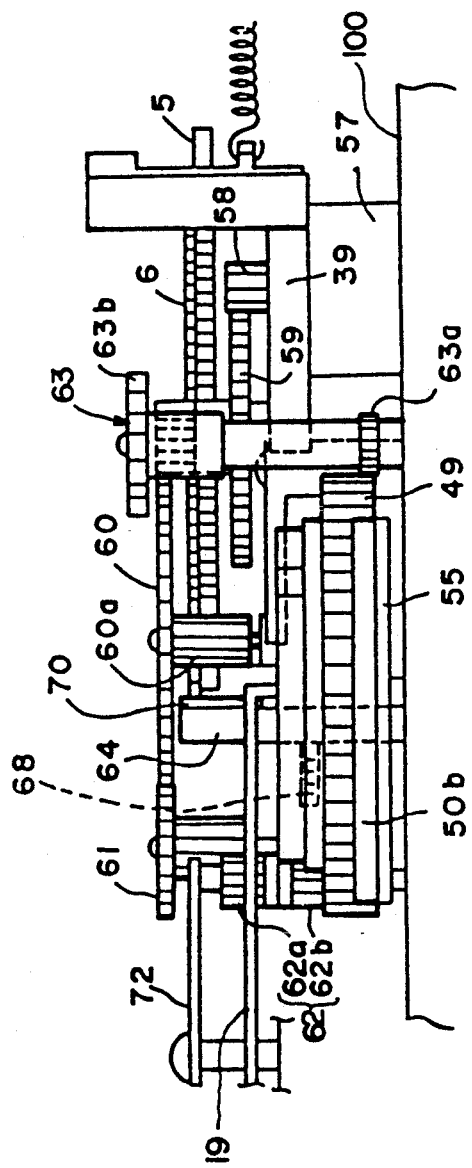
FIG. 11 is a side elevation showing the same.

The rotation of the drive gear 58 driven by the motor 57 is delivered to the fifth gear 63 in mesh with the rack 38 of the tray 26 by a first power transmission system, which comprises the first and second gears 59, 60, a third gear 61, a fourth gear 62 and the cam gear 49 as seen in FIGS. 5 and 11.

The first gear 59 has a large gear portion meshing with the drive gear 58 and a small gear portion meshing with the large gear portion 60b of the second gear 60. The large gear portion 60b further meshes with a large gear portion of the third gear 61, which has a small gear portion in mesh with an upper-half gear segment 62a of the fourth gear 62 as seen in FIG. 10. The fourth gear 62 has a lower-half gear segment 62b in mesh with the upper half of a gear portion 50 of the cam gear 49. The lower half of the gear portion 50 is in mesh with a lower gear portion 63a of the fifth gear 63. The fifth gear 63 has an upper gear portion 63b meshing with the tray rack 38.

Figure 14A:
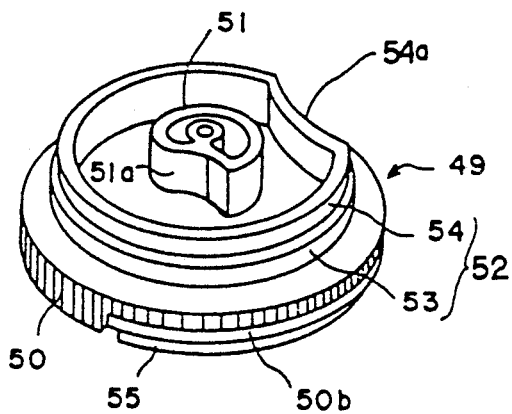
FIGS. 14 (a), (b) and (c) are a perspective view, plan view and rear view, respectively, of a cam gear.
Figure 14B:
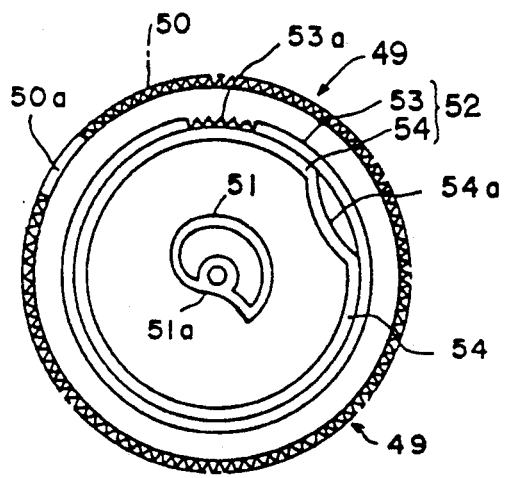
Figure 14C:
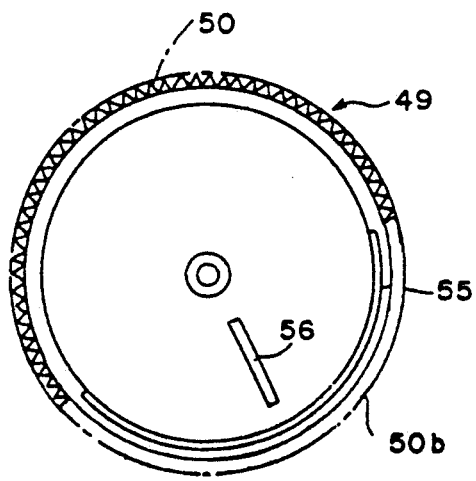

As shown in FIG. 14 (a), the cam gear 49 has the gear portion 50 at its outer periphery. As shown in FIG. 14 (b), the upper half of the gear portion 50 has a toothless part 50a over a specified region. As seen in FIG. 14 (c), the lower half of the gear portion 50 also has a toothless part 50b over a specified region. The toothless parts 50a, 50b will be further described with reference to the operation of the player.

The cam gear 49 has on its upper face a first ridge 51 and a second ridge 52 arranged concentrically therewith as shown in FIG. 14 (a). The first ridge 51 positioned inside the second ridge is formed with a cam face 51a adapted for sliding contact with the cam follower 19c of the drive lever 19. The cam face 51a is so shaped as to gradually approach the center of the gear 49 as the gear rotates clockwise. The outer second ridge 52 includes an upper portion 54 and a lower portion 53 positioned at a lower level and having a larger outside diameter than the upper portion 54. As seen in FIG. 14 (b), the upper portion 54 of the second ridge is formed with a circular-arc cam face 54a which is inwardly curved. The lower portion 53 of the second ridge 52 has a gear part 53a over a specified region. The phase relationship of the cam faces 51a, 54a and the region of the gear part 53a will be described later with reference to the operation of the player.

As seen in FIG. 10, the cam follower 19c of the drive lever 19 is in sliding contact with the first ridge 51 of the cam gear 49, such that the drive lever 19 is moved by the rotation of the cam gear 49 against the spring 23.

A cam follower 45 of a sensor lever 39 is in sliding contact with the upper portion 54 of the second ridge 52 of the cam gear 49 for detecting the size of disc as will be described later.

As seen in FIG. 14 (c), a circular-arc ridge 55 is formed on the bottom of the cam gear 49 inside and over the same region as the toothless part 50b. The bottom is further formed with a projection 56 extending radially of the gear inside the ridge 55. On completion of withdrawal of the tray, the projection 56 turns on a switch 85 disposed at an end portion of the chassis 100 as shown in FIG. 4, whereby the completion of withdrawal of the tray is detected as will be stated later.

The rotation of the drive gear 58 is delivered to the small gear portion 60a of the second gear 60 meshing with the first and second racks 5, 6 on the pickup 1 through a second power transmission system, which comprises the first gear 59 and the large gear portion 60b of the second gear 60 shown in FIGS. 3 to 5 and FIG. 10.

Power Transmission Change-over and Pickup Restraining Mechanism

Figure 12:
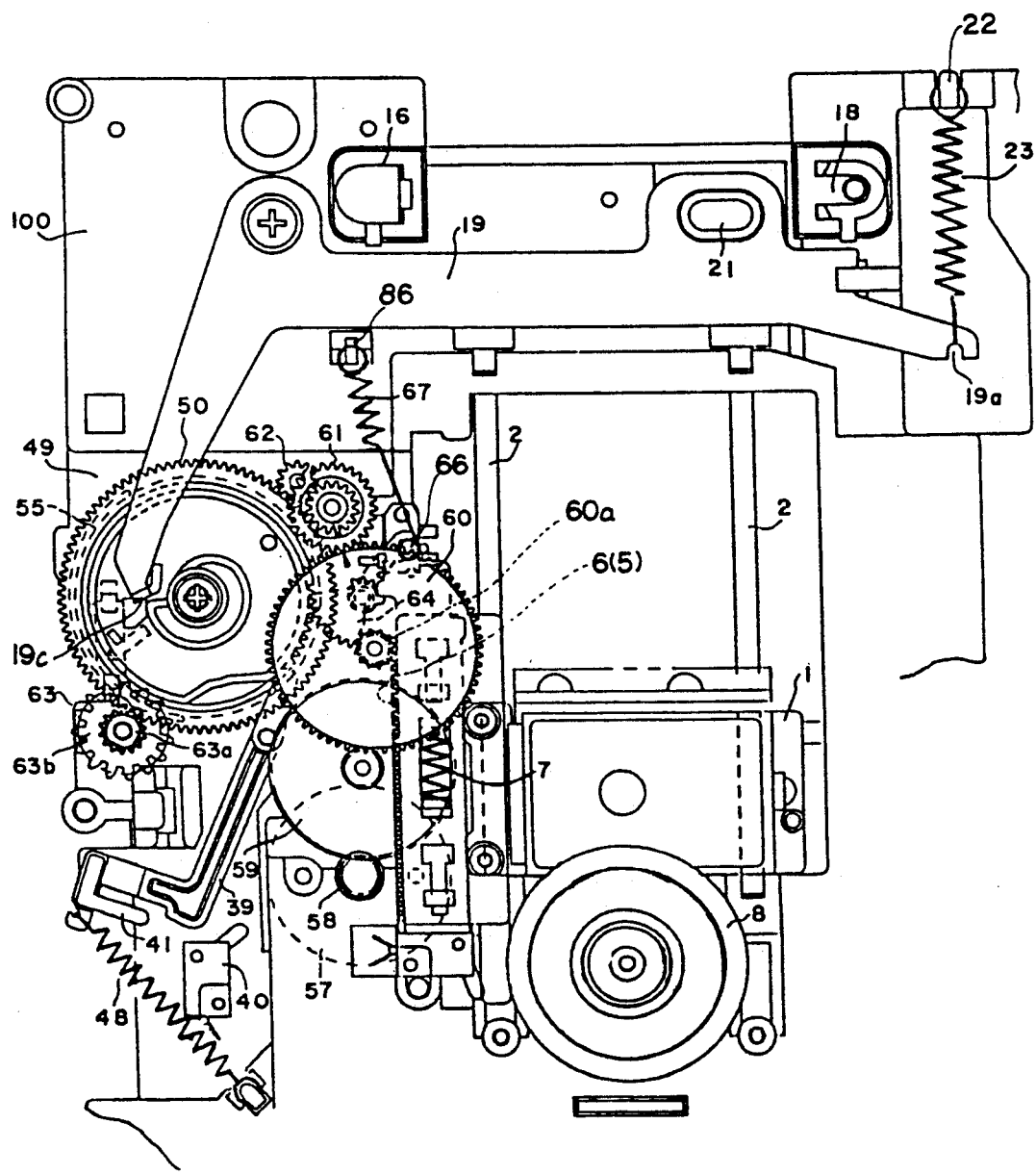
FIG. 12 is a plan view of the same.

With reference to FIGS. 4, 10 and 11, a trigger member 64 is provided between the cam gear 49 and the first and second racks 5, 6 on the pickup 1 and is rotatably supported by a pin 65 on the chassis 100. The trigger member 64 is formed at its upper end with a trigger gear 70 meshable with the trigger rack 6b at the inner end of the second rack 6. Projecting from the lower end of the trigger member 64 is a sectorial jaw 68 engageable with the lower portion of the second ridge 52 of the cam gear 49 and formed with a gear 69 along its outer edge. The trigger member 64 has a hook 66 projecting from its midportion. As shown in FIGS. 4 and 12, a spring 67 is provided between the hook 66 and a projection 86 on the chassis 100 for biasing the trigger member 64 counterclockwise.

Figure 20:
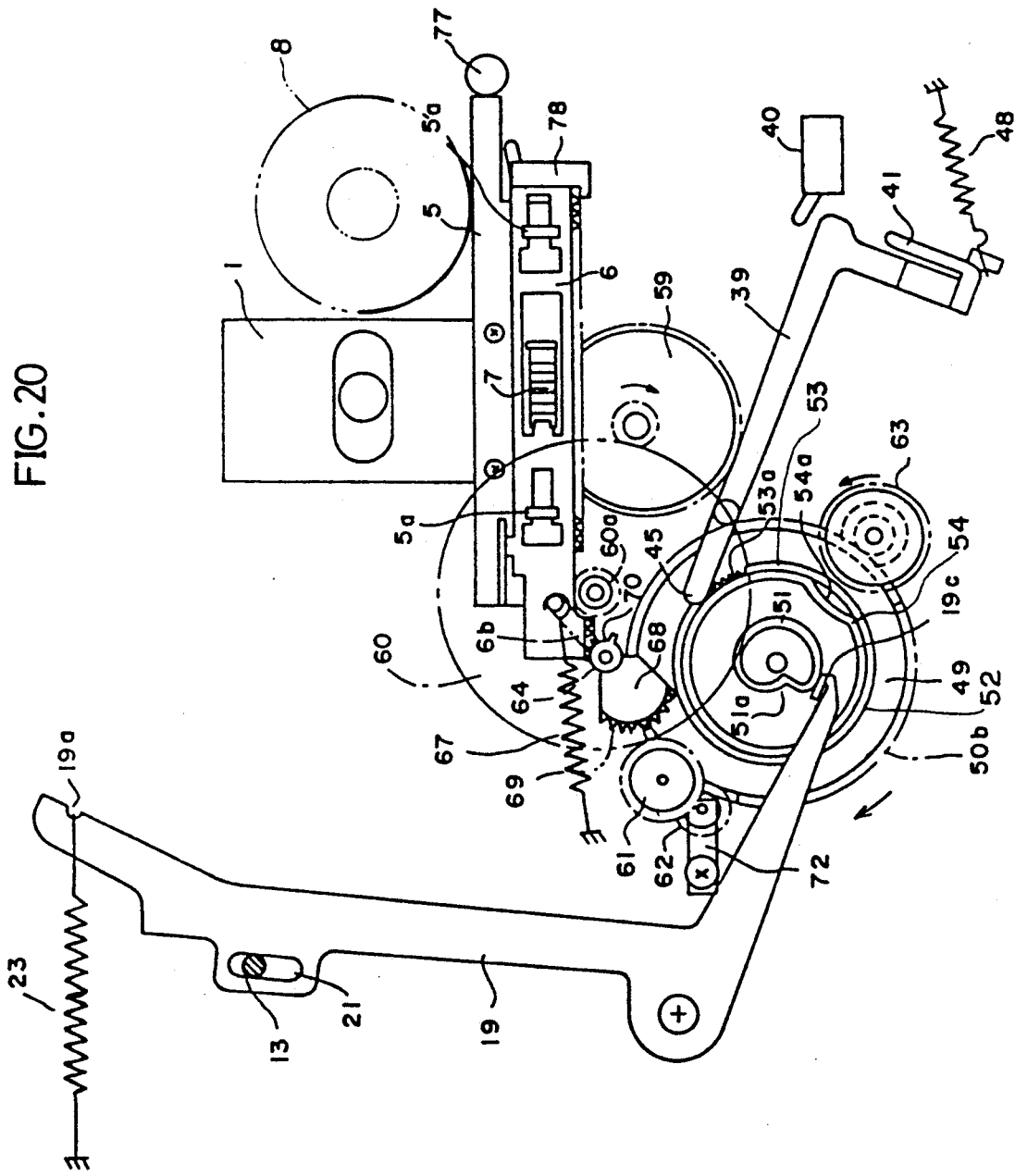
FIGS. 20 to 24 are sequential plan views showing change-over operation of the first and second power transmission systems.

With reference to FIG. 20, when the first power transmission system from the first gear 59 through the fifth gear 63 is in operation to transport the disc, the trigger member 64 is in sliding contact at one end of its jaw 68 with the second ridge lower portion 53 of the cam gear 49 and is restrained from moving clockwise by the spring 67. At this time, the trigger gear 70 of the trigger member 64 is in mesh with the trigger rack 6a of the second rack 6, biasing the second rack 6 rightward against the spring 7 and therefore allowing the spring 7 to bias the first rack 5 rightward with its repellent force. Consequently, the pickup 1 is forcibly restrained from movement at the end of its travel toward the turntable 8.

Figure 21:
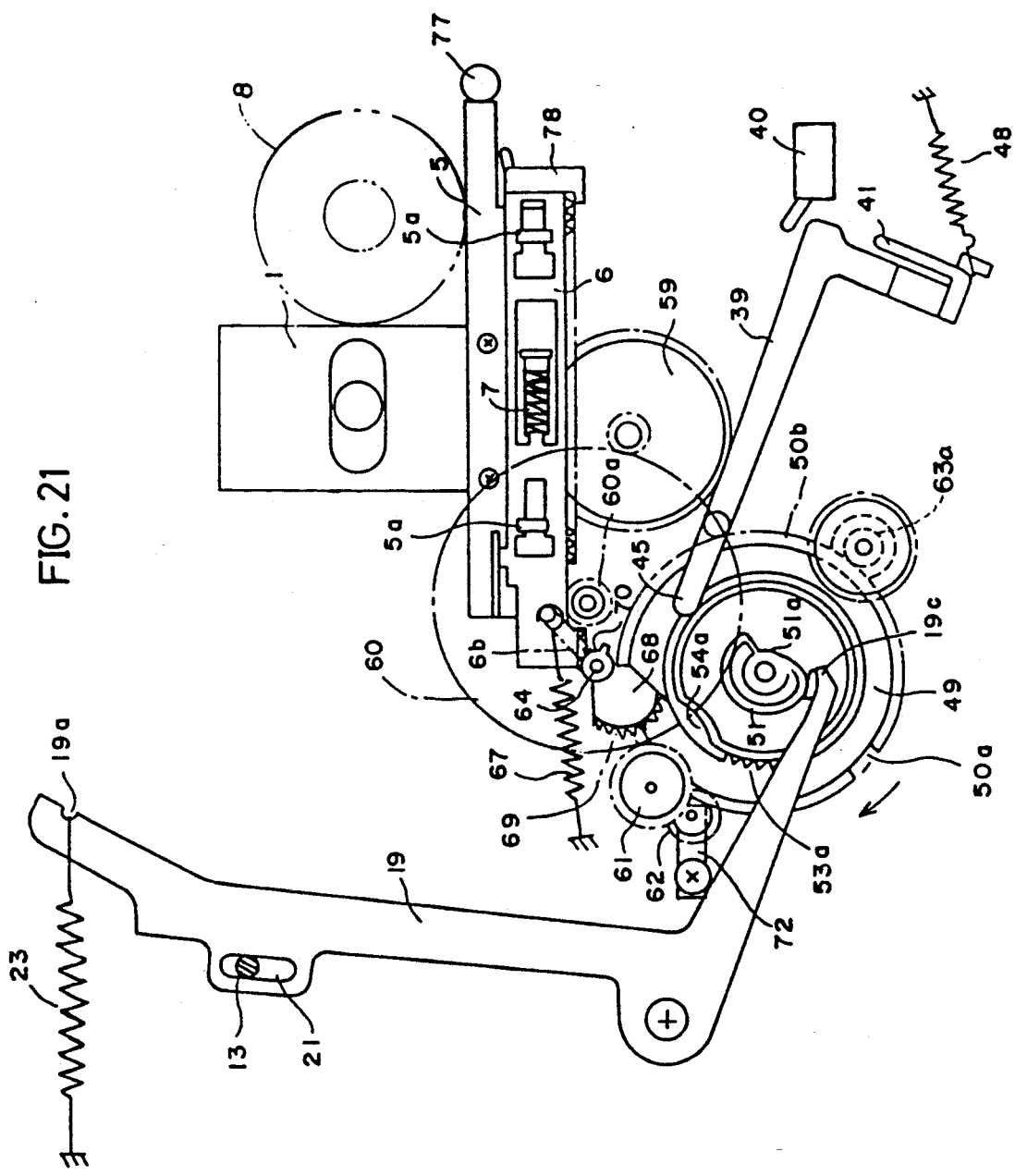
Figure 22:
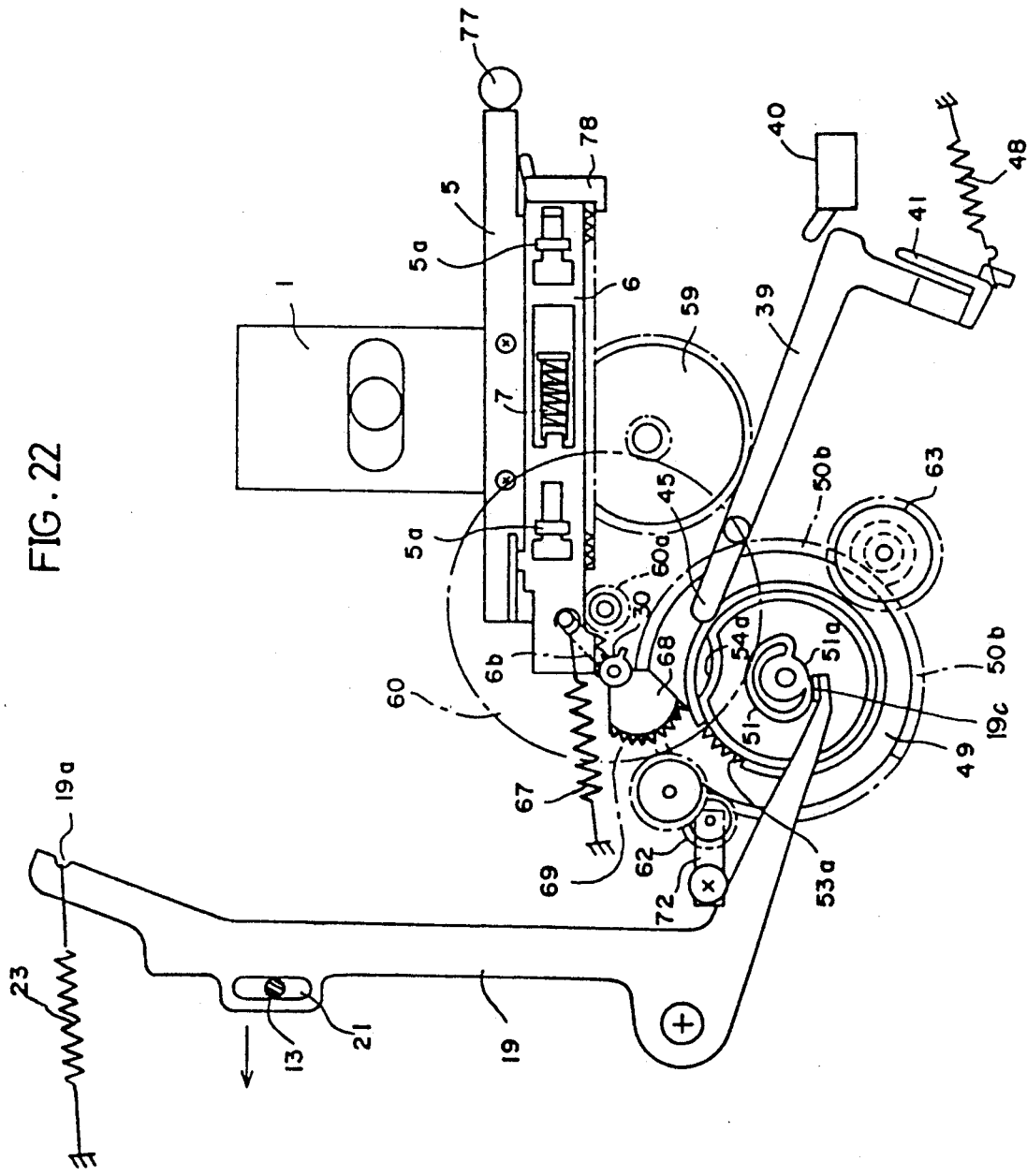
Figure 23:
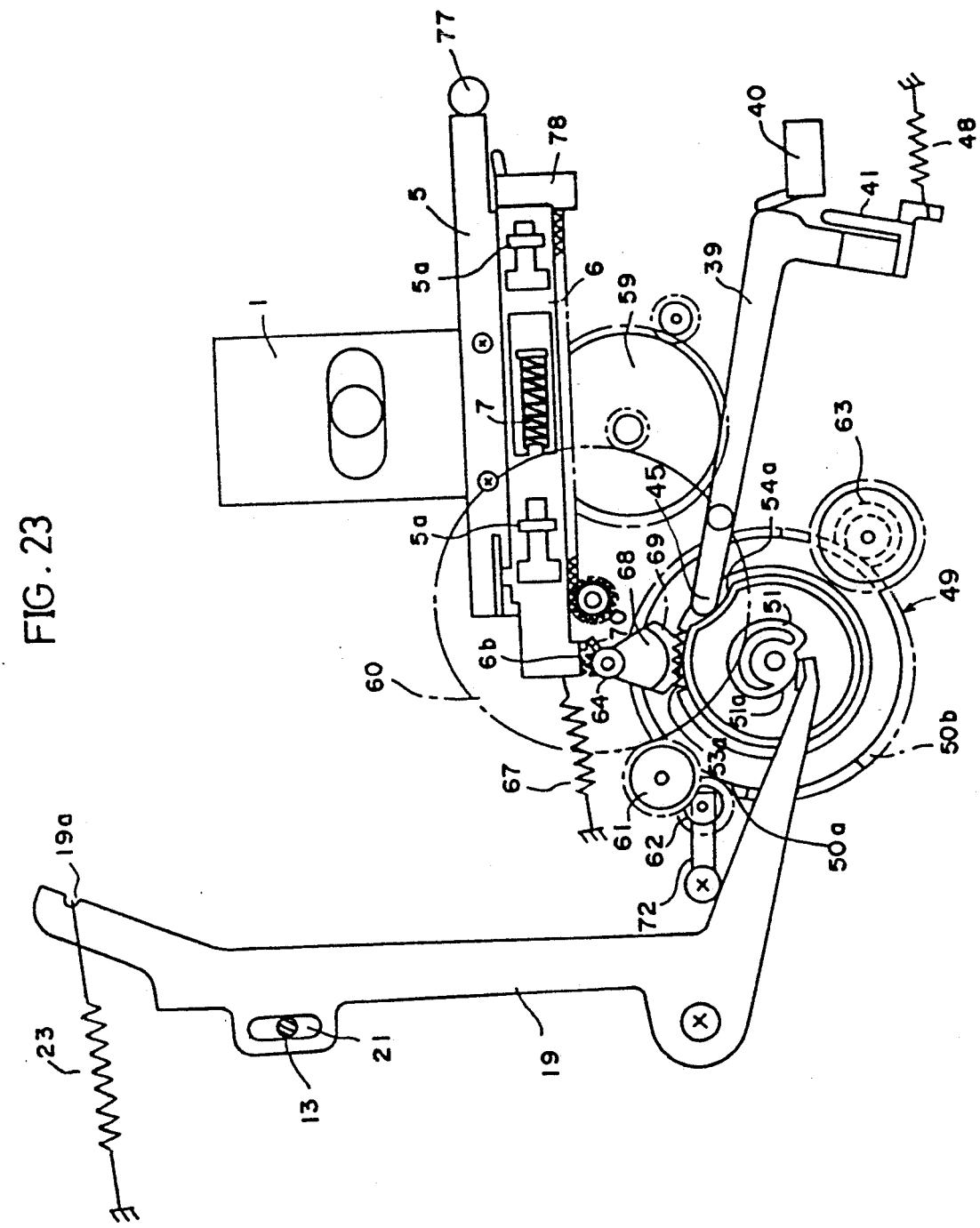
Figure 24:
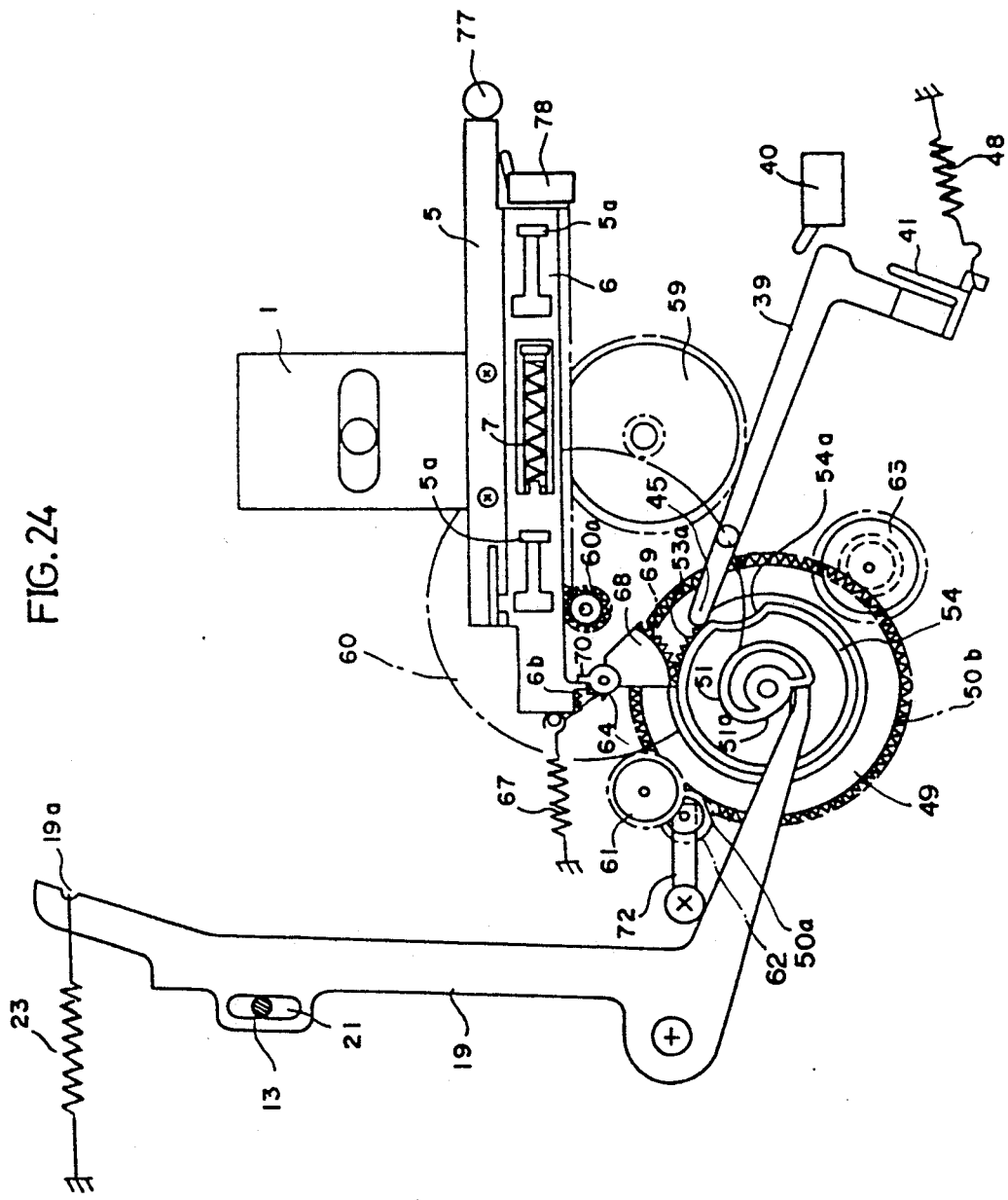

In this state, the cam gear 49 rotates clockwise, assuming the states of FIGS. 21 and 22 and then the state of FIG. 23, in which the gear part 53a of the second ridge lower portion 53 of the cam gear 49 comes into engagement with the gear 69 of the jaw 68 of the trigger member 64 to rotate the trigger member 64 counterclockwise, whereby the trigger gear 70 drives the trigger rack 6a to move the second rack 6 leftward as shown in FIG. 24.

During the change from the state of FIG. 22 to the state of FIG. 24, the trigger member 64 and the second rack 6 meshing therewith, which are biased by the springs 67, 7, rotate counterclockwise or move leftward with the rotation of the cam gear 49, with the result that the second rack 6 comes into meshing engagement with the small gear portion 60a of the second gear 60.

The subsequent rotation of the small gear portion 60a further moves the first and second racks 5, 6 leftward, and both the racks 5, 6 mesh with the gear portion 60a.

With the start of the meshing, the toothless part 50a of the gear portion 50 of the cam gear 49 is opposed to the fourth gear 62, and the gear portion 50 is brought out of meshing engagement with the fourth gear 62, whereby the rotation of the cam gear 49 and the fifth gear 63 is discontinued to stop the transport of the tray.

Figure 25:
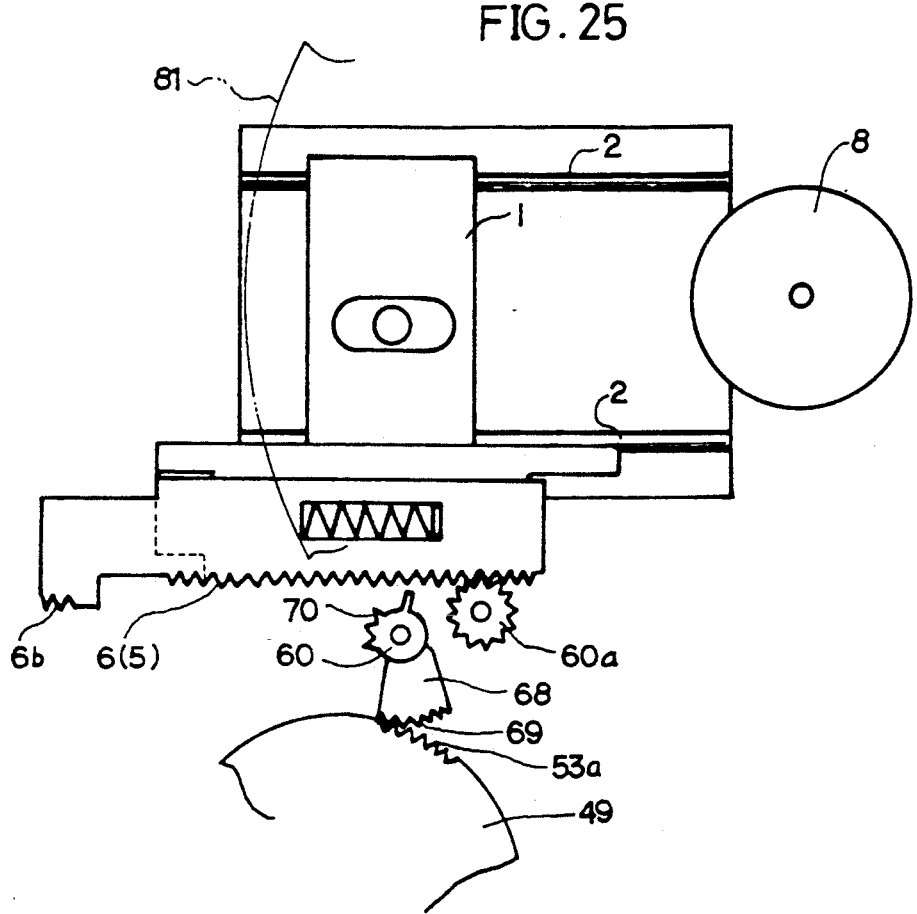
FIGS. 25 to 28 are sequential plan views showing a pickup restraining operation by the trigger member.

With reference to FIG. 25, the small gear portion 60a of the second gear 60 thereafter drives the first and second racks 5, 6 to travel the pickup 1 along the shafts 2, 2 for the reproduction of signals.

Figure 26:
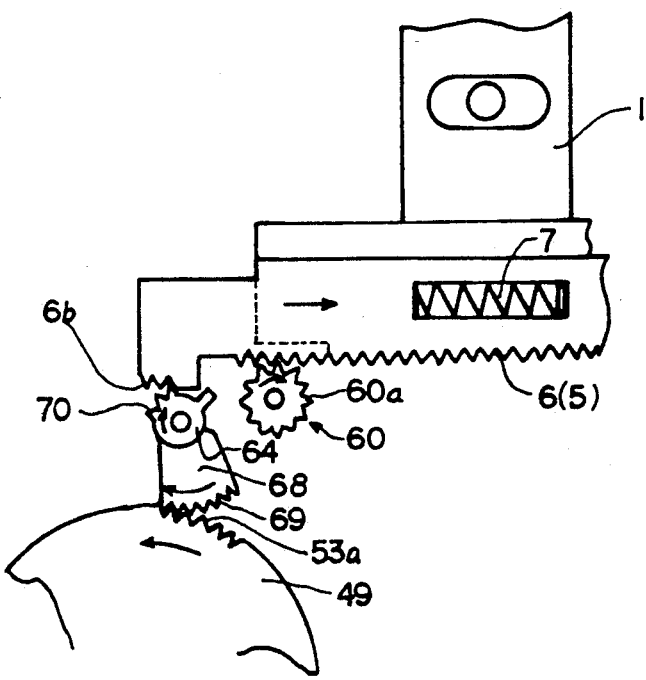

On completion of signal reproduction, the small gear portion 60a of the second gear 60 rotates clockwise, moving the pickup 1 to the end of its travel path toward the turntable 8 as shown in FIG. 26. When the pickup 1 reaches the path end, the gear portion 60a is in mesh with the second rack 6 only.

Figure 27:
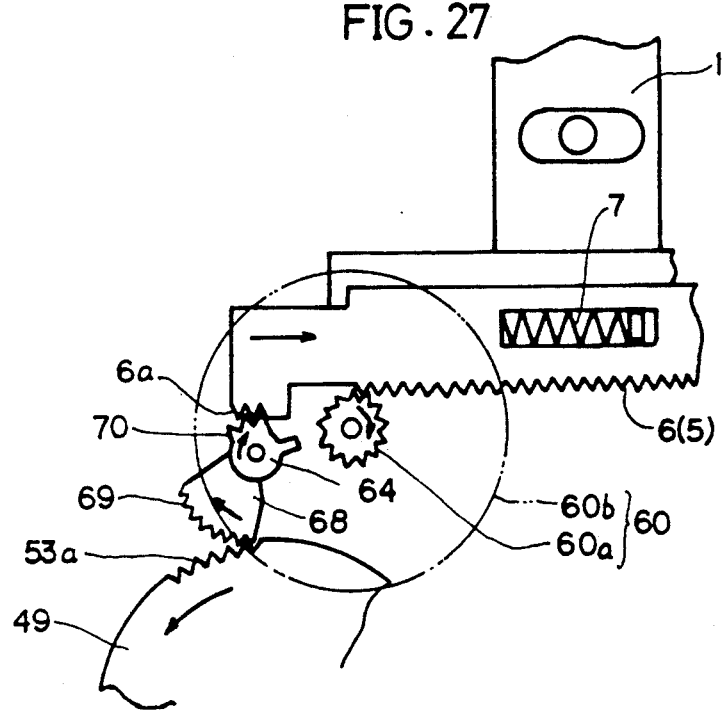

Further clockwise rotation of the small gear portion 60a drives the second rack 6 rightward against the spring 7 as shown in FIG. 27. With this movement, the trigger rack 6a starts meshing with the trigger gear 70 of the trigger member 64 again, thereby slightly driving the trigger member 64 clockwise. Consequently, the cam gear 49 starts to rotate counterclockwise, thereby bringing its gear portion 50 into meshing engagement with the fourth gear 62 in rotation as shown in FIG. 23.

The small gear portion 60a is thereafter brought out of meshing engagement with the second rack 6, while the rotation of the second gear 60 is delivered to the trigger rack 6a of the second rack 6 via the third gear 61, fourth gear 62, gear part 53a of the cam gear 49 and trigger member 64.

When the gear part 53a of the cam gear 49 comes out of mesh with the gear 69 of the trigger member 64, with the jaw 68 brought into contact with the peripheral surface of the lower portion 53 of the cam gear 49, the rotation of the cam gear 49 is no longer transmitted to the trigger member 64, so that the second rack 6 stops. In this state, the trigger member 64 is biased counterclockwise by the repellent force of the spring 7, whereas the trigger member 64 is locked in the position shown in FIG. 28 by the contact of the jaw 68 with the lower portion 53 of the cam gear 49.

Thus, during the disc clamping operation and the disc transport operation, the pickup 1 is restrained from travel at the end of path of its travel toward the turntable 8 by the force of the spring 7 in its compressed state.

The aforementioned switch 85 and a stopper 79 are provided at an end portion of the chassis 100. The switch 85 serves to limit the counterclockwise rotation of the cam gear 49 as will be described later, while the stopper 79 limits the clockwise rotation of the cam gear 49.

Disc Size Detecting Mechanism

Whether the disc clamped to the turntable 8 has a large diameter or small diameter is judged according to whether a switch 40 on the chassis 100 is turned on by the aforementioned sensor lever 39 rotatably supported by a pivot 46 on the chassis 100 as seen in FIGS. 4 and 10. The sensor lever 39 has a hole 43 having the pivot 46 inserted therethrough, a projection 41 adapted to contact the peripheral edge of the disc on the turntable when the lever 39 is pivotally moved, an actuating portion 42 adapted to contact the switch 40 and a cam follower 45 in sliding contact with the upper portion 54 of the cam gear 49. A spring 48 extends between a hook 44 at the base end of the lever 39 and a hook 47 on the chassis 100 for biasing the sensor lever 39 counterclockwise. Accordingly, the sliding contact of the cam follower 45 with the upper portion 54 of the cam gear 49 restricts the pivotal movement of the lever 39. When the cam face 54a is opposed to the cam follower 45 with the rotation of the cam gear 49, the sensor lever 39 moves counterclockwise under the action of the spring 48.

Figure 13:
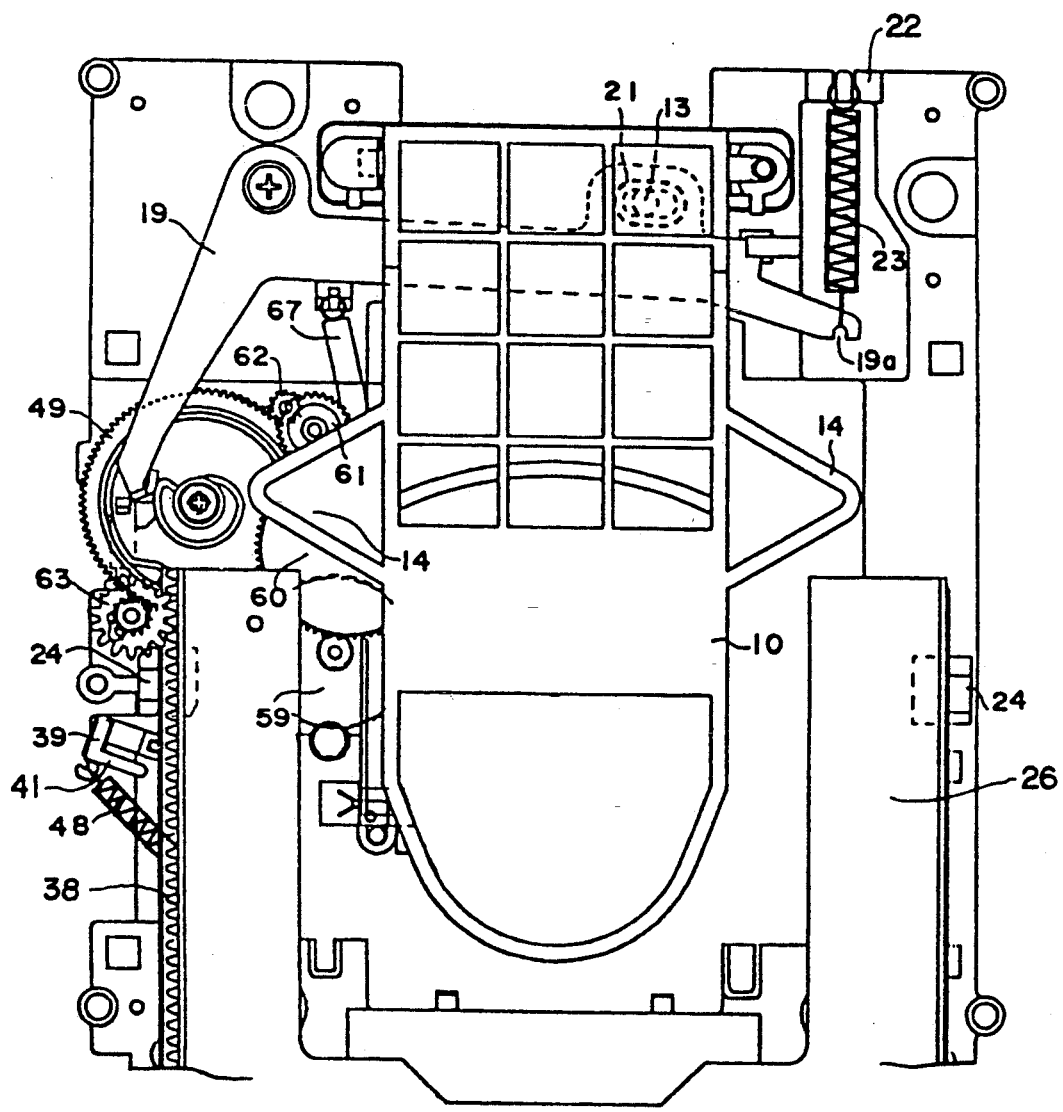
FIG. 13 is a plan view showing the clamp on the chassis.

When the tray 26 is in the disc unloaded position shown in FIG. 13 and while the tray is in movement, the projection 41 of the sensor lever 39 remains in a position away from the rack 38 of the tray 26, making the tray 26 transportable free of trouble.

When the tray 26 is brought to the disc loaded position with the disc completely clamped in place as shown in FIG. 18, the cam face 54a of the cam gear 49 is opposed to the cam follower 45 of the sensor lever 39.

When the disc on the turntable 8 is large as indicated at 81, the projection 41 of the sensor lever 39 comes into contact with the edge of the disc 81, interrupting the counterclockwise movement of the lever 39 and holding the actuating portion 42 out of pressing contact with the switch 40.

On the other hand, if the disc on the turntable 8 is small as indicated at 82 in FIG. 19, the lever 39 moves until the cam follower 45 comes into contact with the cam face 54a, allowing the actuating portion 42 to press the switch 40 and turn it on.

Consequently, the size of disc is detectable according to whether the switch 40 is on or off.

After the disc has been clamped, the cam gear 49 further rotates clockwise as shown in FIG. 24, permitting the cam follower 45 of the sensor lever 39 to bear on the second ridge upper portion 54 of the cam gear 49 and holding the lever 39 in the limit position of its clockwise movement. The lever projection 41 therefore will not interfere with the rotation of the disc.

Break Preventing Mechanism

Figure 15:
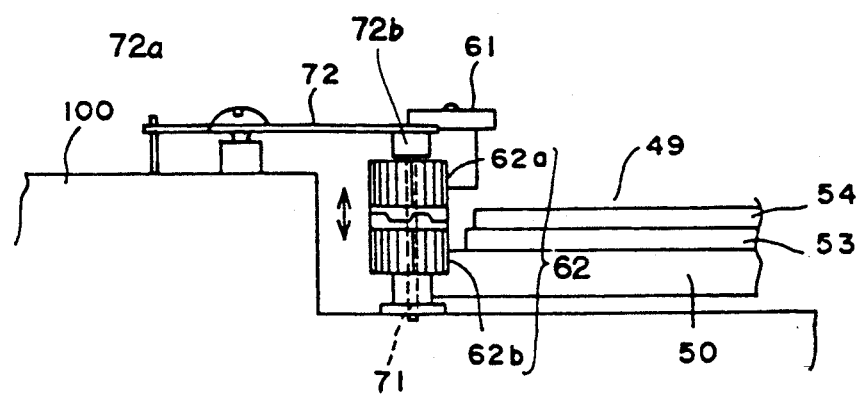
FIG. 15 is a side elevation showing a break preventing mechanism.
Figure 16:
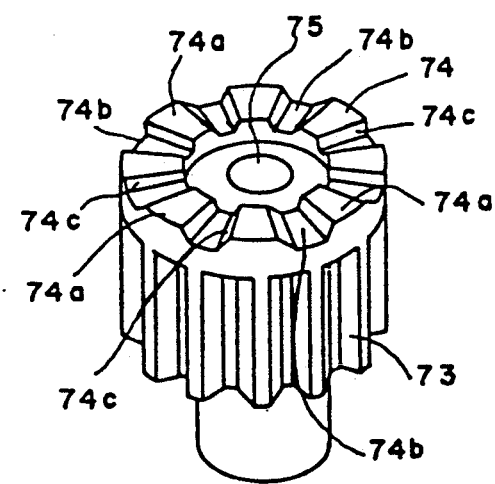
FIG. 16 is an enlarged perspective view showing an engagement portion constituting the break preventing mechanism.

If the tray is forced to stop or pushed back during the operation of the motor 57, for example, during the transport of the tray, for one cause or another, the motor 57 and the power transmission system will be excessively loaded, with the likelihood that the motor 57 or gear or the like will be broken. Accordingly, the fourth gear 62 is provided with a break preventing mechanism as seen in FIG. 15. The upper-half segment 62a and the lower-half segment 62b constituting the fourth gear 62 are independent of each other and are each freely rotatably supported by a shaft 71 on the chassis 100. With reference to FIG. 16, each of the gear segments 62a, 62b has a central bore 75 for the shaft 71 to extend therethrough, a gear portion 73 on its outer periphery and an engagement portion engageable with the other gear segment. The engagement portion has ridges 74a and furrows 74b extending radially outward from the center of rotation and arranged alternately at a specified pitch with slopes 74c formed therebetween.

With reference to FIG. 15, a plate spring 72 mounted on the chassis 100 has one end fixed to the chassis 100 and the other end carrying a depressing piece 72b in pressing contact with the upper end of the shaft 71. The plate spring 72 is pressed downward with an adjusting screw 72a. Accordingly, the pressure to be exerted on the shaft 71 by the depressing piece 72b can be controlled by rotating the adjusting screw 72a.

During normal power transmission, the two gear segments 62a, 62b rotate together in engagement with each other, whereas if the power to be transmitted increases beyond a predetermined value, the slopes 74c of the gear segments act like cams, displacing the ridges 74a of one of the gear segments from the furrows 74b of the other segment to raise the upper segment 62a against the plate spring 72 out of engagement with the lower segment 62b, followed by repeated engagement and disengagement between the ridges 74a and the furrows 74b.

The mechanism therefore obviates the break of the motor 57 due to an abnormal increase in the load or the break of gears of the power transmission system.

The engagement portions of the gear segments can be provided by a pair of frictional clutch surfaces which exhibit a suitable frictional force.

Tray Positioning Mechanism

Figure 17A:
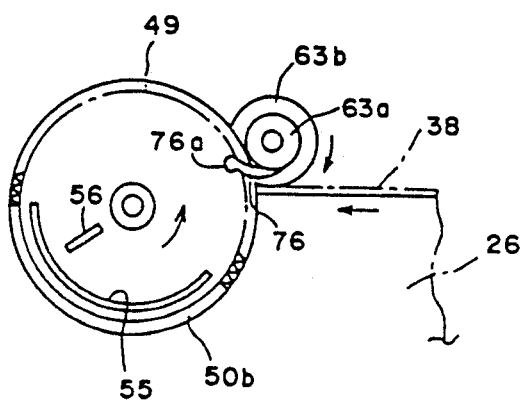
FIGS. 17 (a), (b) and (c) are rear views of the cam gear and a fifth gear for showing the operation of a tray positioning mechanism.
Figure 17B:
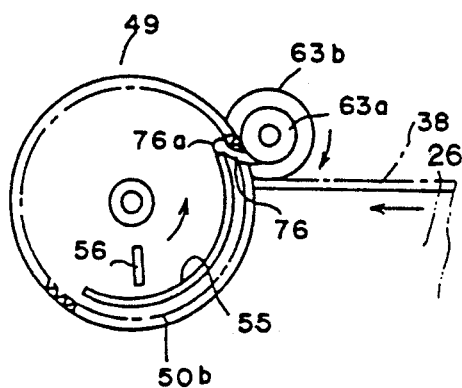
Figure 17C:
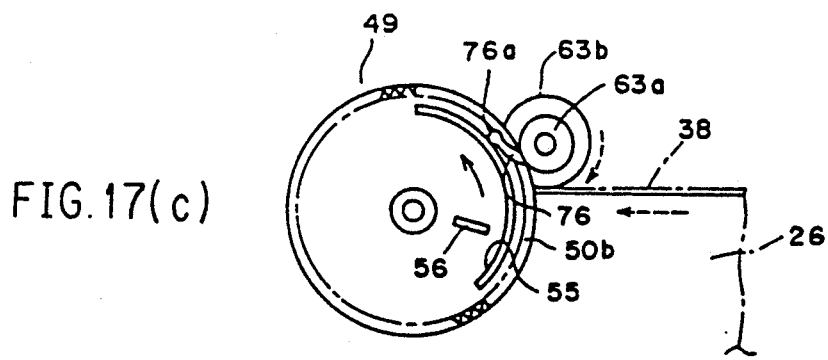

When the tray 26 has been brought to the disc loaded position shown in FIG. 2, the tray 26 is locked in this position by a tray positioning mechanism, which as seen in FIGS. 17 (a), (b) and (c) comprises a resilient piece 76 projecting from the lower gear portion 63a of the fifth gear 63, and the aforementioned circular-arc ridge 55 on the bottom face of the cam gear 49.

During the transport of the tray 26, the fifth gear 63 rotates with the rotation of the cam gear 49. In this state, the ridge 55 is away from the resilient piece 76, allowing the resilient piece 76 to rotate idly as seen in FIG. 17 (a). Subsequently, immediately before the completion of transport of the tray, the ridge 55 comes into contact with the free end 76a of the resilient piece 76 as shown in FIG. 17 (b). On completion of transport of the tray as seen in FIG. 2 with the inner end of the tray 26 in contact with bosses 16, 16 on the chassis 100, the lower half of the gear portion 50 of the cam gear 49 comes out of meshing engagement with the upper gear portion 63b of the fifth gear 63, and the toothless part 50b of the gear portion 50 is opposed to the upper gear portion 63b of the fifth gear 63.

The cam gear 49 continues its rotation thereafter, thereby causing the ridge 55 on the cam gear 49 elastically deform the resilient gear 63 and holding the outer peripheral surface of the ridge 55 in sliding contact with the free end 76a of the deformed resilient piece 76 as shown in FIG. 17 (c).

Consequently, the fifth gear 63 is biased to rotate in the direction of transport of the tray as indicated by a broken line in the drawing by the repellent force of the deformed resilient piece 76, whereby the tray 26 is similarly biased and held in the disc loaded position shown in FIG. 2.

Thus, the tray is held in this position during the clamping operation or during the reproduction of signals.

A sequential operation of the disc player will be described below.

Loading of Disc

When the tray 26 is in its withdrawn position as advanced outward from the player body as seen in FIG. 1, the first and second power transmission systems and the foregoing mechanisms are in the state shown in FIG. 20. More specifically, the drive lever 19 is held in its clockwise rotated position against the spring 23 by the contact of the cam follower 19c with the first ridge 51 of the cam gear 49. Accordingly, the clamp 10 is held out of the clamping state with its projection driven by the drive lever 19 as seen in FIG. 29.

The sensor lever 39 is held in its clockwise moved position against the spring 48 since the cam follower is in contact with the peripheral surface of the second ridge upper portion 54 of the cam gear 49. The trigger gear 70 on the trigger member 64 consituting the pickup restraining mechanism is in mesh with the trigger rack 6a, and the pickup 1 is restrained by the repellent force of the spring 7 in the end of path of its travel in most proximity to the turntable 8.

When the motor 57 is started, driving the first gear 59 clockwise, the fifth gear 63 is rotated counterclockwise through the train of gears 60, 61, 49 to transport the tray 26 in the loading direction. During this movement, the small gear portion 60a is in idle rotation since it is out of meshing engagement with the first and second racks 5, 6 attached to the pickup 1. Further during the movement, the drive lever 19, the sensor lever 39 and the trigger member 64 are in sliding contact with the first ridge 51, the second ridge upper portion 54 and the second ridge lower portion 53 of the cam gear 49, respectively, and therefore remain at rest.

When the cam gear 49 has been rotated to the position shown in FIG. 21, the toothless part 50b of the cam gear 49 is opposed to the lower gear portion 63a of the fifth gear 63 as already stated, and the tray positioning mechanism functions to lock the tray in position upon the completion of transport of the tray.

Disc Clamping Action

With the cam gear 49 in continued rotation, the cam face 51a of the first ridge 51 advances into sliding contact with the cam follower 19c of the drive lever 19 as seen in FIG. 22. The drive lever 19 is therefore allowed to be moved counterclockwise by the spring 23 to lower the clamp 10 as shown in FIG. 30. This causes the pins 15, 15 on the clamp 10 to depress the pins 35, 35 on the pivotal bars 33, 33 shown in FIG. 6 to thereby retract the four lifters 29 into the tray 26. Consequently, the disc on the tray is lowered onto the turntable 8 and clamped thereto by the pressure plate 10a.

Detection of Disc Size

After the disc has been completely clamped, the cam gear 49 continues to rotate clockwise, bringing the cam face 54a of the second ridge 52 thereof into opposed relation to the cam follower 45 of the sensor lever 39. This permits the spring 48 to move the sensor lever 39 counterclockwise. In accordance with the position to which the lever 39 (actuating portion 42) is thus moved, the switch 40 is turned on or remains off, whereby the size of the disc is detected. In accordance with the size thus detected, the travel of the pickup is subsequently controlled.

Transport of Pickup

Approximately simultaneously with the detection of the disc size, the second ridge gear part 53a of the cam gear 49 meshes with the gear 69 on the jaw 68 of the trigger member 64. With the counterclockwise movement of the trigger member 64 mentioned above, the second rack 6 is also subjected to the action of the spring 7. Consequently, the second rack 6 moves leftward. This brings the second rack 6 into meshing engagement with the small gear 60a of the second gear 60 as seen in FIG. 24. At this time, the rotation of the cam gear 49 is discontinued with the toothless part 50a of the gear 49 opposed to the fourth gear 62.

Subsequently, the rotation of the small gear 60a of the second gear 60 slightly moves the pickup 1 leftward, whereupon the switch 78 is turned off to deenergize the motor 57.

The cam gear 49 at rest as seen in FIG. 24 is subjected to the clockwise force of the spring 67 through the trigger member 64, with the result that the projection 56 on the bottom of the cam gear 49 is pressed against the stopper 79 on the chassis 100 and thereby locked.

Reproduction of Signals from Disc

In response to a reproduction instruction given to the player with the switch 78 turned off, the pickup 1 operates to project a laser beam on the disc, and the presence or absence of the disc is detected by detecting the light reflected from the disc, if any. If the absence of the disc is detected, the player is set in a stop mode, whereas if the presence of disc is detected, the spindle motor 9 is initiated into operation for the disc of the size detected. When the disc is large and therefore great in moment of inertia, the control system for the spindle motor 9 is set to a great gain, whereas if the disc is of small diameter, the control system is set to a small gain. The pickup 1 is then slightly moved toward the center of the disc to cause the pickup to read T.O.C (table of contents) from the inner peripheral portion of the disc. Signals are then reproduced in the usual manner based on the read data.

On completion of signal reproduction, the pickup 1 is sent to the position shown in FIG. 24, where the pickup waits for the next instruction with the switch 78 on.

Unloading of Disc

Figure 28:
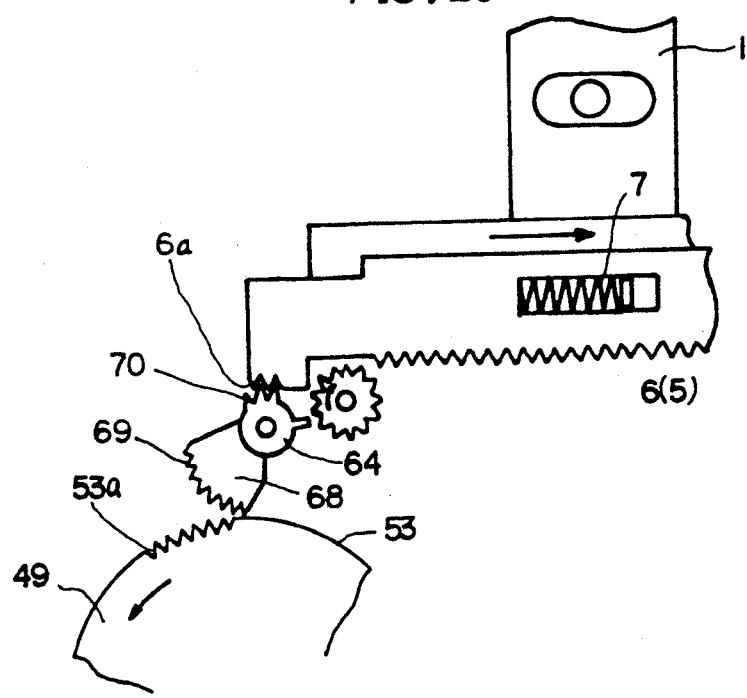

The disc is unloaded by an operation reverse to the above operation. The motor 57 rotates in a direction opposite to the disc loading direction, thereby driving the second rack 6 on the pickup 1 rightward from the position shown in FIG. 24. During this movement, the trigger rack 6a of the second rack 6 comes into meshing engagement with the trigger gear 70 of the trigger member 64 as shown in FIGS. 27 and 28 to rotate the cam gear 49 counterclockwise. As a result, the gear portion 50 of the cam gear 49 meshes with the fourth gear 62 and initiated into counterclockwise rotation with the torque from the motor 57.

During this movement, the pickup restraining mechanism functions as already stated, locking the pickup 1 at the end of path of its travel toward the turntable 8 as shown in FIG. 21.

The rotation of the cam gear 49 thereafter causes the cam face 51a of the first ridge 51 thereof to move the drive lever 19 clockwise, thereby raising the clamp 10 as seen in FIG. 29 to release the disc from the clamp.

The cam gear 49 thereafter further rotates counterclockwise, thereby driving the fifth gear 63 in FIG. 10 clockwise to start withdrawal of the tray.

On completion of withdrawal of the tray, the projection 56 on the bottom face of the cam gear 49 turns on the switch 85 on the chassis 100. The motor 57 is deenergized in response to a signal from the switch.

According to the present invention described above, the tray, clamp and pickup can be driven by a single motor in sequence smoothly, while the pickup, when at rest, can be restrained from moving at one end of the path of its travel, for example, even if subjected to a shake or vibration from outside. Thus, the position of the pickup is controllable accurately.

Furthermore, the mechanisms provided on the chassis, such as the positioning mechanism for locking the tray in the disc loaded position, the mechanism for detecting the size of the disc clamped onto the turntable, and the mechanism for regulating the disc supporting lifters to a specified level, are all simple in construction and are therefore useful for making the disc player small-sized and lightweight.

The components of the present player are not limited to those of the foregoing embodiment in construction but can of course be modified variously by one skilled in the art without departing from the spirit of the invention as set forth in the appended claims.

For example, the pickup, when at rest at the other end of path of its travel toward the outer periphery of the disc, can be similarly restrained from moving at this end of the path.

What is claimed is:

1. A disc player wherein a single motor mounted on a chassis for drivingly rotating a disc is coupled to a disc transport mechanism through a first power transmission system and to a pickup transport mechanism through a second power transmission system, the disc player comprising:
   a first intermittent power transmission incorporated in the first power transmission system and effecting power transmission during transport of the disc but non effecting power transmission during transport of a pickup;
   a second intermittent power transmission incorporated in the second power transmission system and not effecting power transmission during transport of the disc but effecting power transmission during transport of the pickup; and
   a pickup restraining mechanism mounted on the chassis for restraining the pickup from moving upon the pickup reaching one end of a path of its travel, the pickup restraining mechanism having an input portion that connects to the first power transmission system when the pickup reaches said one end of the path, and an output portion movable from a first position to a second position with the transmission of power tot he input portion, the output portion being releasable from the pickup transport mechanism at the first position and connecting to the pickup transport mechanism at the second position to restrain the pickup at the path end.

2. A disc player as defined in claim 1 wherein the pickup transport mechanism includes a gear drivingly rotatable by said single motor and a rack fixed to the pickup and meshable with the first gear, and the pickup restraining mechanism includes a trigger member supported on the chassis and having an input portion gear and a trigger gear serving as the output portion, and a trigger rack coupled to the rack by a spring and meshable with the trigger gear of the trigger member, the trigger gear of the trigger member being meshable with the trigger rack simultaneously when a gear portion formed on a rotatable member of the first power transmission system meshes with the input portion gear of the trigger member so as to drive the trigger rack against the spring, whereby the pickup is biased and held at the path end where the pickup is to be restrained.

3. A disc player as defined in claim 1 further comprising:
   a clamp mechanism provided on the chassis for rotatably depressing the disc as placed on the turntable into pressing contact with the turntable,
   wherein the clamp mechanism includes
      a clamp supported on the chassis and movable toward and away from the turntable,
      cam means included in the first power transmission system, and
      lever means coupling the clamp to the cam means, the cam means having a cam face for driving the lever means after completion of loading of the disc to lower the clamp toward the turntable.

4. A disc player wherein a single motor mounted on a chassis for drivingly rotating a disc is coupled to a disc transport mechanism through a first power transmission system and to a pickup transport mechanism through a second power transmission system, the disc player comprising:
   a first intermittent power transmission incorporated in the first power transmission system and effecting power transmission during transport of the disc but not effecting power transmission during transport of a pickup;
   a second intermittent power transmission incorporated in the second power transmission system and not effecting power transmission during transport of the disc but effecting power transmission during transport of the pickup; and
   a tray positioning mechanism provided on the chassis for locking a tray in a loading position, the tray positioning mechanisms including a resilient piece provided on a feed gear constituting the disc transport mechanism, and an operating member coupled to the first power transmission system, the operating member being movable into contact with the resilient piece to elastically deform the resilient piece upon the tray moving to the loading position and to cause the tray to be biased and held in the loading position by repellent force of the resilient piece.

5. A disc player as defined in claim 1, further comprising:
   a disc size detecting mechanism mounted on the chassis for determining whether the disc placed on a turntable is a large disc or small disc,
   the detecting mechanism having a sensor lever movable toward or away form the turntable, a switch closable or openable by the movement of the sensor lever, a spring for biasing the sensor lever toward the turntable and cam means coupled to the first power transmission system for regulating the movement of the sensor lever, the cam means being formed with a cam face operable to hold the sensor lever at a position away from the turntable while the disc is being transported and clamped, and to release the sensor lever from said position after the disc has been completely clamped, the switch indicating whether the disc on the turntable is large or small in accordance with whethee the switch is on or off.

6. A disc player wherein a tray for transporting a disc is mounted on a chassis and reciprocatingly movable between a disc unloaded position and a disc loaded position, the tray being provided with a lifter for slightly raising the disc by the force of a spring during the transport of the disc, the disc player being characterized in that a stopper is provided on the chassis under the tray in the disc unloaded position for preventing retraction of the lifter, the lifter being free to move over the stopper and retract into the tray when the disc is completely loaded.

7. A disc player wherein a single motor mounted on a chassis for drivingly rotating a disc is coupled to a disc transport mechanism through a first power transmission system and to a pickup transport mechanism through a second power transmission system, the disc player comprising:
   a first intermittent power transmission incorporated in the first power transmission system and effecting power transmission during transport of the disc but not effecting power transmission during transport of a pickup;
   a second intermittent power transmission incorporated in the second power transmission system and not effecting power transmission during transport of the disc but effecting power transmission during transport of the pickup; and a break preventing mechanism incorporated at least in the first power transmission system for interrupting power transmission therethrough when the power to be transmitted increases abnormally, the break preventing mechanism including a pair of upper and lower gear segments supported by a shaft on the chassis and rotatable independently of each other, and a plate spring provided on the chassis for preventing the rise of the upper gear segment, the upper gear segment being disengageable from the lower gear segment against the plate spring when the power to be transmitted increases abnormally.

8. A disc player as defined in claim 7 wherein the plate spring is in pressing contact with the upper end of the shaft slightly projecting from the upper gear segment, and each of the gear segments has an engageable portion formed with ridges and furrows extending radially from the center of rotation of the segment and arranged at a specified pitch with a slope formed between each ridge and the furrow adjacent thereto.

* * * * *